(12) United States Patent
Ichikawa

(10) Patent No.: US 8,077,982 B2
(45) Date of Patent: Dec. 13, 2011

(54) IMAGE MATCH-POINT DETECTION APPARATUS, IMAGE MATCH-POINT DETECTION METHOD AND STORAGE MEDIUM

(75) Inventor: Yoshikuni Ichikawa, Chiba (JP)

(73) Assignee: Ichikawa Soft Laboratory Co., Ltd., Chiba-Shi, Chiba-Ken (JP)

( * ) Notice: Subject to any disclaimer, the term of this patent is extended or adjusted under 35 U.S.C. 154(b) by 0 days.

(21) Appl. No.: 13/091,205

(22) Filed: Apr. 21, 2011

(65) Prior Publication Data

US 2011/0262045 A1    Oct. 27, 2011

(30) Foreign Application Priority Data

Apr. 22, 2010   (JP) ................. 2010-099029

(51) Int. Cl.
  *G06K 9/68*   (2006.01)
  *G06K 9/62*   (2006.01)
(52) U.S. Cl. ....................................... 382/218; 382/209

(58) Field of Classification Search .................. 382/181, 382/190, 209, 218, 224
See application file for complete search history.

(56) References Cited

U.S. PATENT DOCUMENTS 6,493,465 B2 * 12/2002 Mori et al. .................... 382/209

FOREIGN PATENT DOCUMENTS

| JP | 10-136304 A | 5/1998 |
| JP | 2005-295495 A | 10/2005 |
| JP | 2008-39491 A | 3/2009 |

* cited by examiner

*Primary Examiner* — Daniel Miriam
(74) *Attorney, Agent, or Firm* — Renner, Kenner, Greive, Bobak, Taylor & Weber

(57) ABSTRACT

An image match-point detection apparatus has a pattern detection part, a pattern storage part, a characteristic-point extraction part and a match-point detection part. The match-point detection part determines whether the pattern numbers of the pattern information extracted as the characteristic-point pattern information for the bitmap images are identical to one another and detects a plurality of the pattern information comprising the identical pattern number, as match-point information.

9 Claims, 27 Drawing Sheets

PATTERN NUMBER    pat_id

PATTERN POSITION    x, y

COUNT VALUE    cnt

| | |
|---|---|
| PATTERN NUMBER | pat_id |
| PATTERN POSITION | x, y |
| MAXIMUM VALUE OF PATTERN POSITION x | max_x |
| MINIMUM VALUE OF PATTERN POSITION x | min_x |
| MAXIMUM VALUE OF PATTERN POSITION y | max_y |
| MINIMUM VALUE OF PATTERN POSITION y | min_y |
| SUMMED-UP VALUE OF PATTERN POSITION x | sum_x |
| SUMMED-UP VALUE OF PATTERN POSITION y | sum_y |
| COUNT VALUE | cnt |

FIG. 11

| | |
|---|---|
| PATTERN NUMBER | pat_id |
| PATTERN POSITION | x, y |
| SUMMED-UP VALUE OF PATTERN POSITION x | sum_x |
| SUMMED-UP VALUE OF PATTERN POSITION y | sum_y |
| SUMMED-UP VALUE OF SQUARE OF PATTERN POSITION x | sum_x2 |
| SUMMED-UP VALUE OF SQUARE OF PATTERN POSITION y | sum_y2 |
| COUNT VALUE | cnt |

PATTERN NUMBER     pat_id

PATTERN POSITION x    x

PATTERN POSITION y    y

| PRIME PATTERN NUMBER | OBSERVATION PROBABILITY |
|---|---|
| 0 | 53 |
| 1 | 5 |
| 2 | 5 |
| 3 | 3 |
| 4 | 5 |
| 5 | 3 |
| 6 | 3 |
| 7 | 2 |
| 8 | 5 |
| 9 | 3 |
| 10 | 3 |
| 11 | 2 |
| 12 | 3 |
| 13 | 2 |
| 14 | 2 |
| 15 | 1 |

| PATTERN NUMBER | pat_id |
| PATTERN POSITION x OF IMAGE A | x0 |
| PATTERN POSITION y OF IMAGE A | y0 |
| PATTERN POSITION x OF IMAGE B | x1 |
| PATTERN POSITION y OF IMAGE B | y1 |

FIG. 27

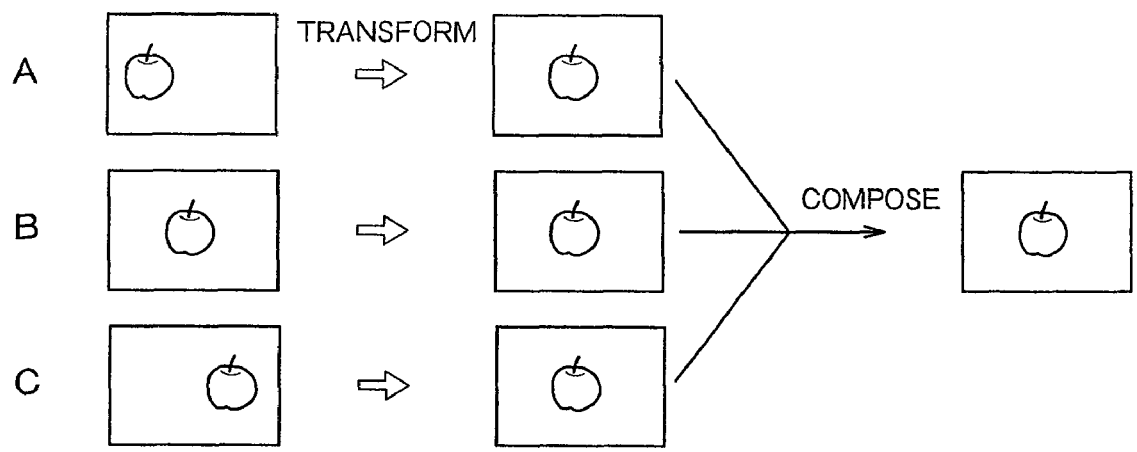
F I G. 29
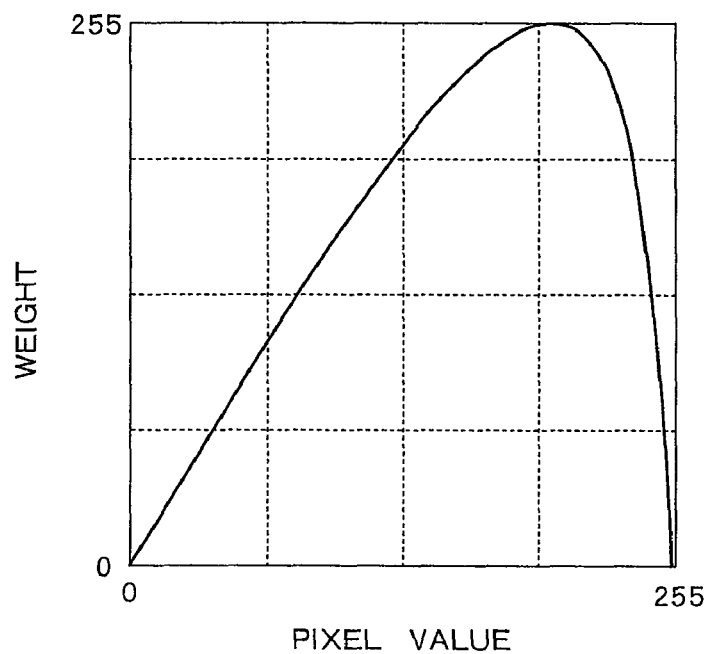
F I G. 30

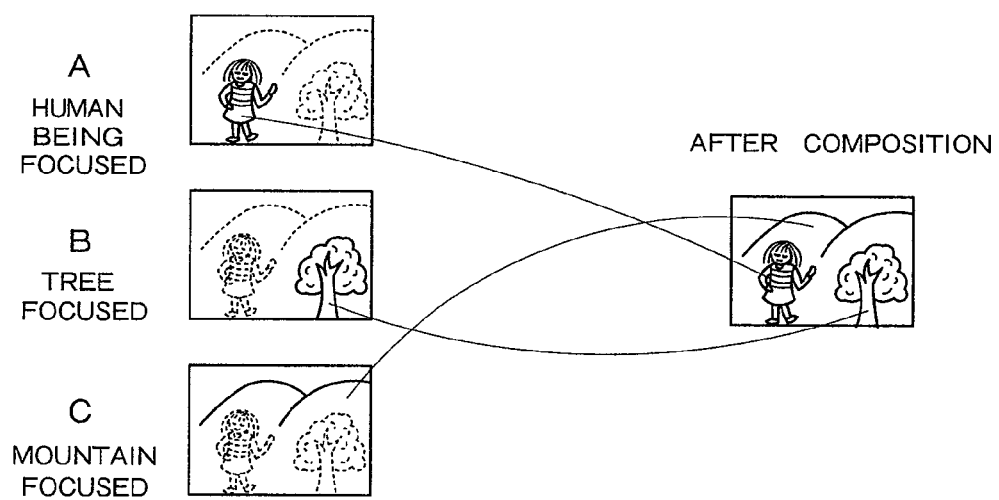
F I G. 33

IMAGE MATCH-POINT DETECTION APPARATUS, IMAGE MATCH-POINT DETECTION METHOD AND STORAGE MEDIUM

CROSS REFERENCE TO RELATED APPLICATIONS

This application is based upon and claims the benefit of priority from the prior Japanese Patent Application NO. 2010-99029, filed on Apr. 22, 2010, the entire contents of which are incorporated herein by reference.

FIELD OF THE INVENTION

The present invention relates to an image match-point detection apparatus that detects match-point information of images included in a plurality of bitmap images.

BACKGROUND OF THE INVENTION

A conventional image match-point detection technique performs an operation such as SAD (Sum Absolute Difference) to many pixel values to detect the match between images by searching for the points of small image difference (refer to Japanese Patent Laid-Open Publication No. 2008-39491).

The SAD, however, requires direct comparison among a plurality of pixel values. Direct comparison is necessary among many pixel values even in searching for one match point. This results in an enormous amount of operation.

For the reason above, a technique has been devised that downscales images to lower the resolution, thereby decreasing the amount of data to be compared, and gradually raises the resolution in searching for the match (refer to Japanese Patent Laid-Open Publication No. 1998-136304). Nevertheless, this technique also requires comparison among pixel values, and hence has a difficulty in drastic reduction of operation amount. In addition, this technique has problems such as detection error in periodic patterns and noises. Therefore, this technique has conventionally low accuracy of match-point detection. Moreover, this technique requires further comparison circuits with an increased amount of operation when rotation of images due to inclination of a camera, movement of a camera in the forward and backward directions, zoom scaling, etc. are taken under consideration.

Japanese Patent Laid-Open Publication No. 2005-295495 discloses a technique of correcting blurred images due to camera shake by extracting a specific number of characteristic points.

Camera movement and shake can be more accurately identified, as match points (characteristic points) are detected more. As match points are detected more, however, the amount of operation increases. Therefore, it causes a higher cost and a larger size, resulting in limited use. Or, the tracking range of movement of a camera or an object to be photographed is conventionally limited.

Moreover, noise reduction, brightness of an object to be photographed, etc. have to be considered before a match-point detection process. Otherwise, the process cannot be put in practical use. The process, therefore, requires improvements such as use of RRF (Radical Reach Filter) which results in further increased amount of operation.

SUMMARY OF THE INVENTION

In view of the foregoing problems, it is an object of the invention to provide an image match-point detection apparatus, an image match-point detection method, and a storage medium, that perform accurate and high-speed detection of match points of images with simple procedures.

According to the present embodiment, an image match-point detection apparatus comprising:

a pattern detection part configured to express a pattern image of each of pixel blocks comprising a plurality of pixels in each of a plurality of bitmap images, by a pattern number of a numerical value expressing a characteristic of each pixel block, the pattern number comprising the number of bits equal to or smaller than the number of original pixel bits equal to the total number of bits of all pixels in each pixel block, and to detect, for each pixel block, pattern information comprising a pair of the pattern number of each pixel block and a pattern position expressing a position of each pixel block;

a pattern storage part configured to classify the pattern information contained in each of the bitmap images by the pattern number and to store the pattern number, the number of times of appearance of an identical pattern number, and information on the pattern position corresponding to each pattern number;

a characteristic-point extraction part configured, for each of the bitmap images, to extract the pattern information that the number of times of appearance of the pattern number is only once, as characteristic-point pattern information, by using information stored in the pattern storage part; and a match-point detection part configured to determine whether the pattern numbers of the pattern information extracted as the characteristic-point pattern information for the bitmap images are identical to one another and to detect a plurality of the pattern information comprising the identical pattern number, as match-point information.

BRIEF DESCRIPTION OF THE DRAWINGS

FIG. 11 is a view showing a data format of a storage buffer in a second pattern storing process;

FIG. 27 is view showing a data format of match-point information;

FIG. 29 is a view illustrating an image transformation technique based on match-point detection information;

FIG. 30 is a view showing one example of an LUT in the form of a graph;

FIG. 33 is a view illustrating a technique of adjusting a weight in accordance with a focal point.

DETAILED DESCRIPTION

Figure 1:
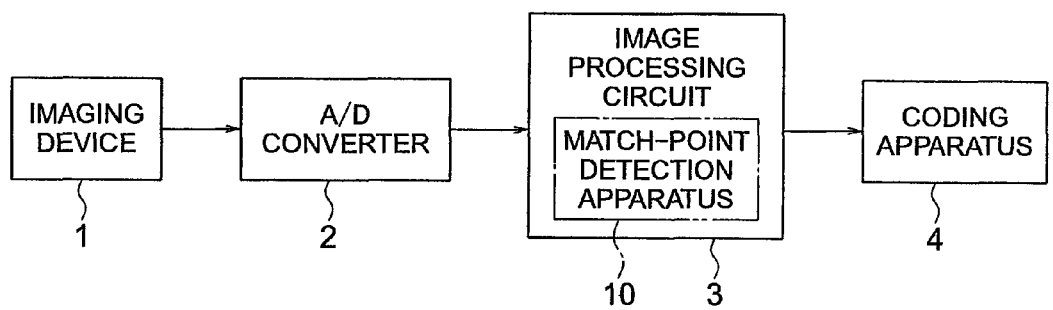
FIG. 1 is a block diagram schematically illustrating the configuration of a video camera equipped with an image match-point detection apparatus according to an embodiment of the present invention.

Embodiments will now be explained with reference to the accompanying drawings.

Basic Principle of Present Embodiment

Explained first is the basic principle of image match-point detection according to the present embodiment. According to the present embodiment, when searching for match points from a plurality of bitmap images, there is no need to directly compare all the pixel values in the bitmap images. In the present embodiment, match points are detected by comparing only match-point pattern information extracted from the respective bitmap images. Therefore, it is possible to detect the match-point with drastically smaller amount of operation than the match-point is detected by comparing pixel values of pixels in the image or results obtained by filtering the pixel values.

One example will be explained below to help understand the basic principle of the present embodiment. Suppose that a photograph of an apple shown in the right side and that of an apple shown in the left side are shown to a human being in order. He or she instantaneously recognizes that the apple has been shifted from right to left. A human being achieves this recognition without comparison of bitmaps each composed of pixels. During the recognition, he or she remembers only the limited slight information about where the apple was located. The technique of the present embodiment is similar to this. According to the present embodiment, a pattern number and a pattern position (coordinates) that represent a relative large-and-small relation among characteristic points contained in the surface or outline of the apple are extracted from the former photograph in which the apple is shown in the right side. The same information is also extracted from the photograph in which the apple is shown in the left side. The two types of information are then compared with each other to extract the position of the same characteristic, and the position is determined as a match point.

When it is supposed that a photograph containing a large number of apples is shown to a human being, he or she determines that it is not wise to memorize the position of apples and instead, memorizes a characteristic part of the picture. The processing operation of the present embodiment is very similar to this.

A feature of the present embodiment is to adopt a unique pattern detection technique in which a relative large-and-small relation among a plurality of pieces of pixel information in a complex image is replaced with a pattern number having a mere one numerical value. Another feature of the present invention is to adopt a characteristic-point extraction technique in which, after numerical values described above are detected from many places of an image, a pattern number that exists at only one position in the image or a detection target area is extracted as a characteristic point. It is easy to extract a numerical value that appears only once from a plurality of numerical values. Practically, however, the pattern that appears several times can be treated as being detected from one position when its appearance remains in a narrow range.

It is significant to extract such a characteristic point. This is because only a characteristic part is extracted from an image. The example of the apple described above is referred to again. When only one apple exists in an image, what is extracted is pattern information detected from pixels on the apple. In contrast, when a large number of apples are shown in the image, another characteristic part is extracted. That is, depending on what is shown in an image, a part that is to be easily found out is automatically determined and its position is recorded. Moreover, the unique information is a string of a numerical value (a pattern number) and a coordinate value (a pattern position). Therefore, compared to the case where image data themselves are compared, the processing cost for this technique is drastically decreased.

The present embodiment has the mechanism in which a characteristic part is automatically identified and extracted. Therefore, the present embodiment can perform a match-point detection process at a high accuracy and a drastically small amount of operation.

Moreover, as a modification to the present embodiment, it is possible to remove and store patterns that often appear, in order to achieve high-speed extraction of a pattern number that is detected at only one position from pattern numbers detected from a bitmap image.

According to the present embodiment, by scanning an image only once, a small amount of data (characteristic-point pattern information) to be used for detecting a match point between the scanned image and anther image can be collected. In addition, since the effect of noise is small, it is not required in the present embodiment to perform conventionally-required pre-processing such as noise reduction that is typical pre-processing. Moreover, erroneous detection at a repeated same pattern can be automatically avoided in the present embodiment. Accordingly, when applied to a digital camera or the like, the processing of the present embodiment can be built in a detection logic that is pre-processing, to perform a low-cost and real-time image match-point detection. Therefore, the present embodiment can achieve a variety of functions such as correction of blurred images due to hand shaking at a low cost.

Detailed Configuration and Operation of Present Embodiment

The present embodiment will be explained below in more detail. FIG. 1 is a block diagram schematically illustrating the configuration of a video camera equipped with an image match-point detection apparatus according to an embodiment of the present invention. The video camera of FIG. 1 is provided with an imaging device 1 for capturing an image, an A/D converter 2 for converting the image taken by the imaging device 1 to digital pixel data, an image processing circuit 3 for performing several types of image processing to the digital pixel data, and a coding apparatus 4 for encoding the digital pixel data after the image processing. An image match-point detection apparatus 10 according to the present embodiment is installed in installed in an image processing apparatus. The image processing apparatus performs the above-described detection processing and image processing. The processing of the image match-point detection apparatus 10 according to the present embodiment may be performed as part of the detection processing or image processing.

Figure 2:
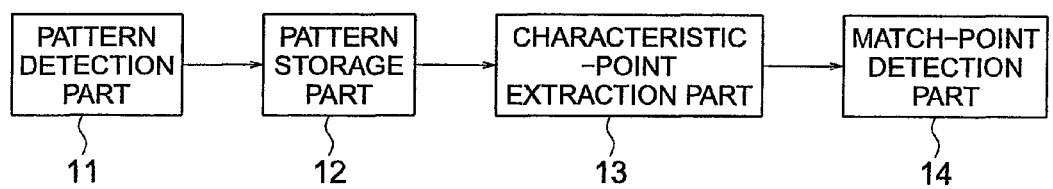
FIG. 2 is a block diagram showing one example of the internal configuration of an image match-point detection apparatus 10.

FIG. 2 is a block diagram that shows one example of the internal configuration of the image match-point detection apparatus 10. The image match-point detection apparatus 10 of FIG. 2 has a pattern detection part 11, a pattern storage part 12, a characteristic-point extraction part 13, and a match-point detection part 14.

The pattern detection part 11 calculates a pattern number that represents pattern information of a pixel block, for each pixel block contained in a bitmap image (merely, referred to as an image, hereinafter), and outputs the pattern number together with the position (a pattern position) of the pattern information. The pattern number represents a numerical value that represents a feature of the pixel block corresponding to a pattern image of the pixel block containing neighboring pixels in the image. The pattern number has a bit length equal to or less than the original number of bits being a total bit number of all the pixels in the pixel block. The pattern number is a numerical value having a characteristic capable of detecting the match of characteristic of images by comparison as to whether numerical values are completely equal to each other. A pair of the pattern number and the pattern position output by the pattern detection part 11 is referred to as pattern information. The pattern detection part 11 detects the pattern information per pixel block.

The pattern storage part 12 classifies the pattern information contained in an image by each of pattern numbers and stores pattern numbers, the number of times of appearance of the same pattern number, and information on the pattern position corresponding to each pattern number.

The characteristic-point extraction part 13 extracts the pattern information that the number of times of appearance of the pattern number in an image is only once, as characteristic-point pattern information, by using several types of information stored in the pattern storage part 12.

The match-point detection part 14 determines whether pattern numbers of pattern information extracted as the characteristic-point pattern information for each of a plurality of images are identical to one another and detects the identical pattern number as match-point information.

The pattern detection part 11 performs firstly pre-processing for detecting a prime pattern number. The prime pattern number is a bitstream signal that represents an arrangement pattern of edges in pixels that surround a target pixel and in this target pixel. The pre-processing is different from the type of input image. Described first is the processing for color images, bayer images, and monochrome multi-gradation images.

Figure 3:
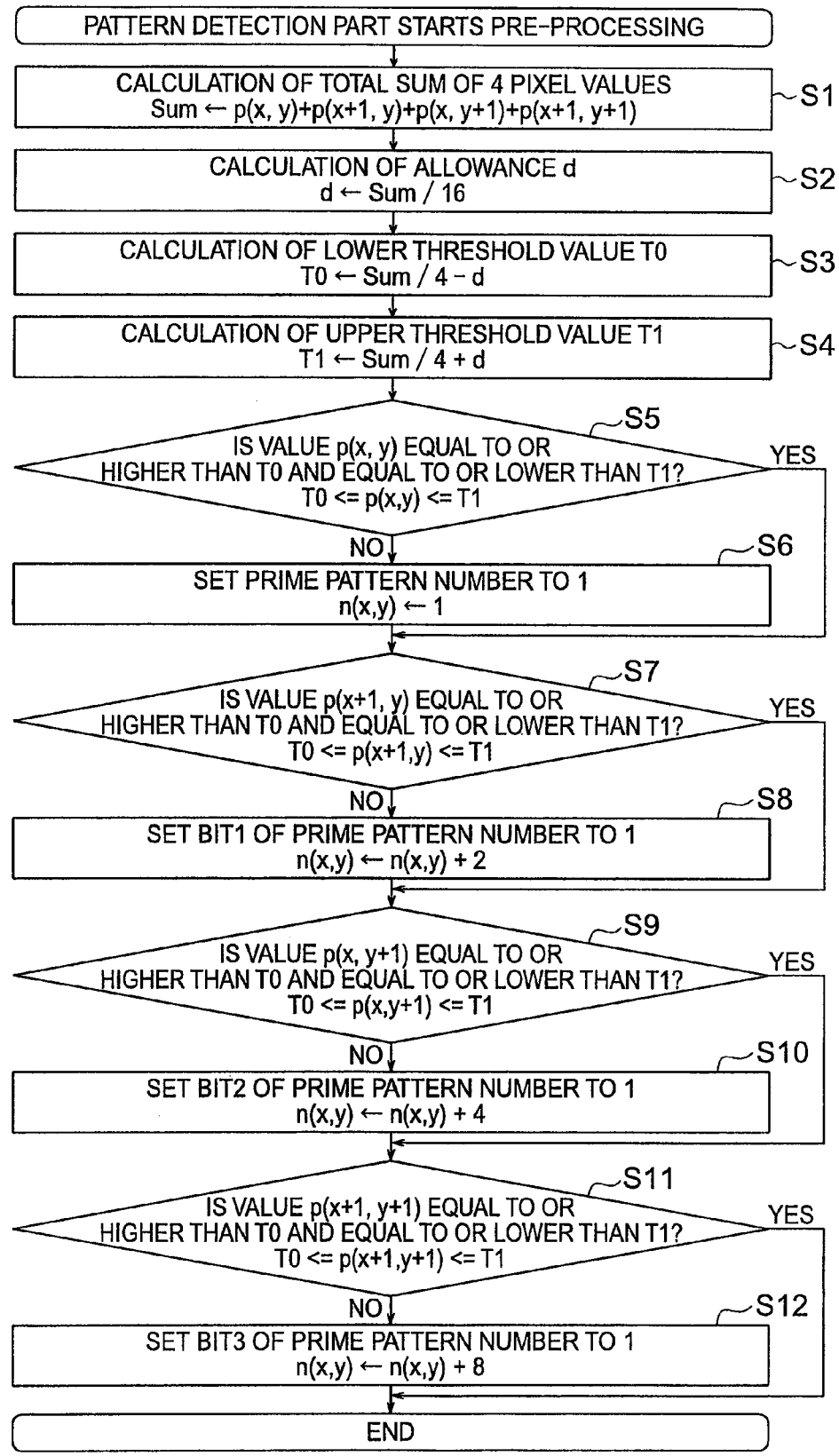
FIG. 3 is a flowchart indicating one example of pre-processing performed by a pattern detection part 11.

FIG. 3 is a flowchart indicating one example of the pre-processing performed by the pattern detection part 11. In this pre-processing, if an image is a color image, it is converted into a monochrome multi-gradation image by calculating luminance values from pixel values of several colors represented by R, G and B, or C, M and Y or the like. Or, a color image is converted into a monochrome multi-gradation image by extracting the pixel values of any one of colors R, G, B, C, M and Y.

In this case, when the imaging device 1 has bayer arrangement, a color image is converted into a monochrome multi-gradation image with half resolution in the vertical and horizontal directions based on a pixel value of any one of R, GinR, GinB and B, or any one of C, M, Y and G. Or, a color image is converted into a monochrome multi-gradation image with calculation of luminance values by demosaic processing. And then, the pre-processing is performed.

When the imaging device 1 has honeycomb arrangement, the pixels are converted into square pixels or those on the odd or even lines only are extracted and then converted into monochrome multi-gradation square pixels, followed by the pre-processing.

Figures 4, 5:
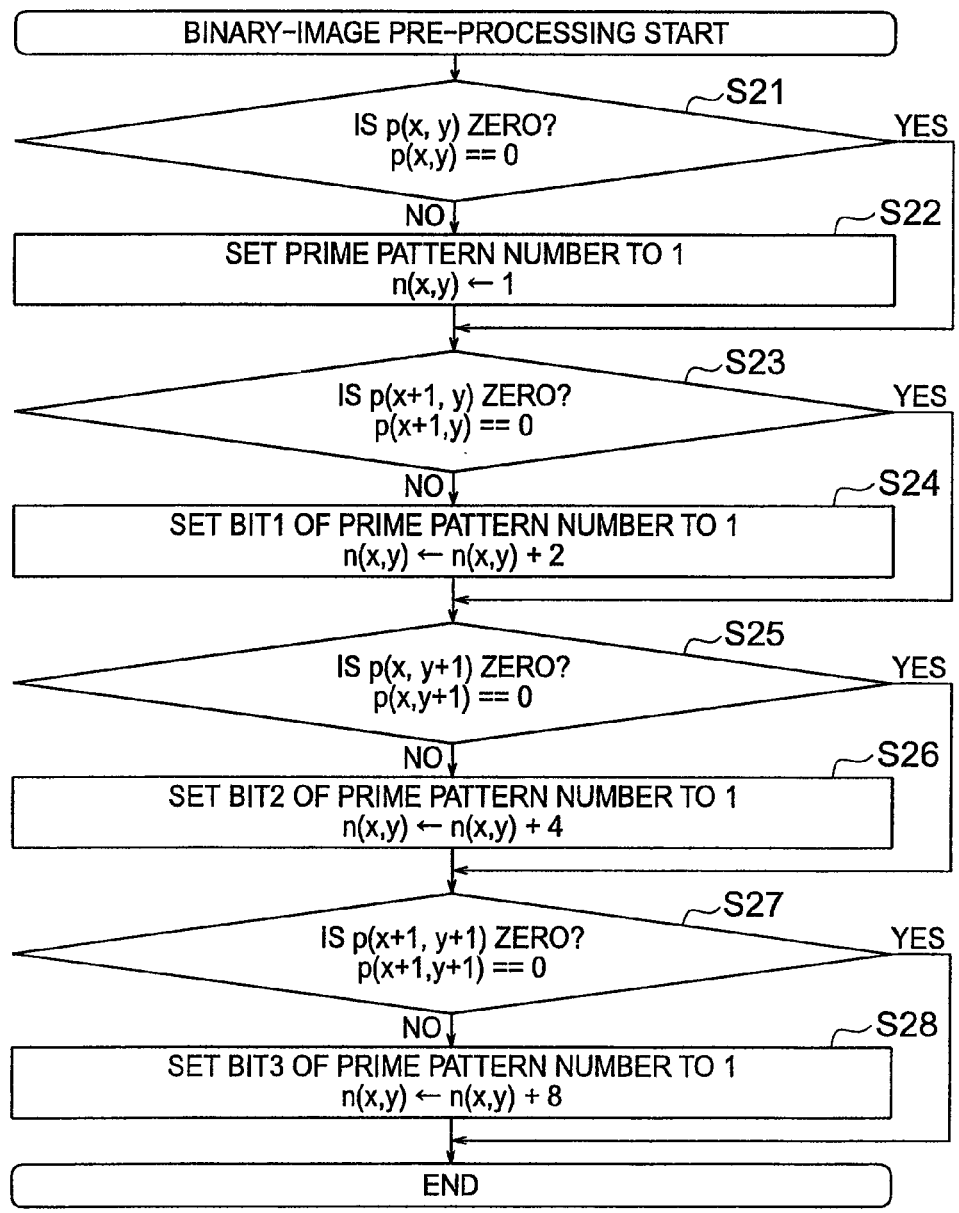
FIG. 4 is view of one example of the positions of four pixels to be used in detection of a prime pattern number.
FIG. 5 is a flowchart indicating one example of pre-processing for the case in which a binary image is input.

Suppose that the pixel position of a target pixel is (x, y) and its pixel value is p(x, y). The four pixel values of the target pixel, the right pixel, the lower pixel, and the diagonally lower-right pixel are expressed as p(x, y), p(x+1, y), p(x, y+1), and p(x+1, y+1). FIG. 4 is a view of one example of the positions of these four pixels. The sum of these four pixels is expressed by an equation (1) below.

$$\text{Sum} = p(x,y) + p(x+1,y) + p(x,y+1) + p(x+1,y+1) \tag{1}$$

Based on equations (2) to (4) shown below, d, T0 and T1 are calculated.

$$d = \text{Sum}/16 \tag{2}$$

$$T0 = \text{Sum}/4 - d \tag{3}$$

$$T0 = \text{Sum}/4 + d \tag{4}$$

The prime pattern number is a 4-bit bitstream signal. The bit value is decided according to the following criteria. The prime pattern number is expressed as n(x, y) hereinbelow, If p(x, y) is equal to T0 or larger but equal to T1 or smaller, Bit0 is set to 0, if not, to 1.

If p(x+1, y) is equal to or larger than T0 but equal to or smaller than T1, Bit1 is set to 0, if not, to 1.

If p(x, y+1) is equal to or larger than T0 but equal to or smaller than T1, Bit2 is set to 0, if not, to 1.

If p(x+1, y+1) is equal to or larger than T0 but equal to or smaller than T1, Bit3 is set to 0, if not, to 1.

A detailed procedure of the pre-processing will be explained step by step with reference to FIG. 3. Firstly, according to the equation (1), the sum of pixel values of four neighboring pixels including a target pixel is calculated (step S1). Next, according to the equation (2), allowance d is calculated (step S2). Then, according to the equation (3), a lower threshold value T0 is calculated (step S3). And then, according to the equation (4), an upper threshold value T1 is calculated (step S4).

It is then determined whether a value p(x, y) of the target pixel is fallen in a range from the lower threshold value T0 to the upper threshold value T1 (step S5). If it is out of the range, the least-significant bit Bit0 of a prime pattern number is set to 1 (step S6). The prime pattern number n is 0 in a default state.

It is then determined whether the value p(x+1, y) of the pixel neighboring in the right side of the target pixel is fallen in the range described above (step S7). If it is out of the range, Bit1 of the prime pattern number is set to 1 (step S8).

If it is determined as being within the range in step S7 or if step S8 ends, it is determined whether the value p(x, y+1) of the pixel neighboring in lower side of the target pixel is fallen in the range described above (step S9). If it is out of the range, Bit2 of the prime pattern number is set to 1 (step S10).

If it is determined as being within the range in step S9 or if step S10 ends, it is determined whether the value p(x+1, y+1) of the pixel in the right and lower side of the target pixel is fallen in the range described above (step S11). If it is out of the range, Bit3 of the prime pattern number is set to 1 (step S12). Then, the process of FIG. 3 ends.

Explained next is the pre-processing for the case where the image to be input to the pattern detection part 11 is a binary image. In this pre-processing, since p(x, y) takes only two values of 0 or the other (usually, 1), a prime pattern number n(x, y) is set as shown below.

If p(x, y) is 0, Bit0 is set to 0, if not, to 1.
If p(x+1, y) is 0, Bit1 is set to 0, if not, to 1.
If p(x, y+1) is 0, Bit2 is set to 0, if not, to 1.
If p(x+1, y+1) is 0, Bit3 is set to 0, if not, to 1.

FIG. 5 is a flowchart indicating one example of the pre-processing for the case in which a binary image is input. Firstly, it is determined whether p(x, y) is 0 or not (step S21). If not 0, Bit0 of a prime pattern number is set to 1 (step S22). The prime pattern number n is 0 in a default state.

If it is determined as 0 in step S21 or if step S22 ends, it is determined whether p(x+1, y) is 0 or not (step S23). If it is not 0, Bit1 of the prime pattern number is set to 1 (step S24).

If it is determined as 0 in step S23 or if step S24 ends, it is determined whether p(x, y+1) is 0 or not (step S25). If it is not 0, Bit2 of the prime pattern number is set to 1 (step S26).

If it is determined as 0 in step S25 or if step S26 ends, it is determined whether p(x+1, y+1) is 0 or not (step S27). If it is not 0, Bit3 of the prime pattern number is set to 1 (step S28). Then, the process of FIG. 5 ends.

When the pre-processing of FIG. 3 or 5 is finished, the pattern detection part 11 performs a pattern-number generation process. In the pattern-number generation process, the pattern detection part 11 generates a pattern number that represents the type of a bit pattern of surrounding 3×3 prime pattern numbers (referred to as a pixel block, hereinafter) having a center prime pattern number n(x, y) to be processed.

Figures 6, 7:
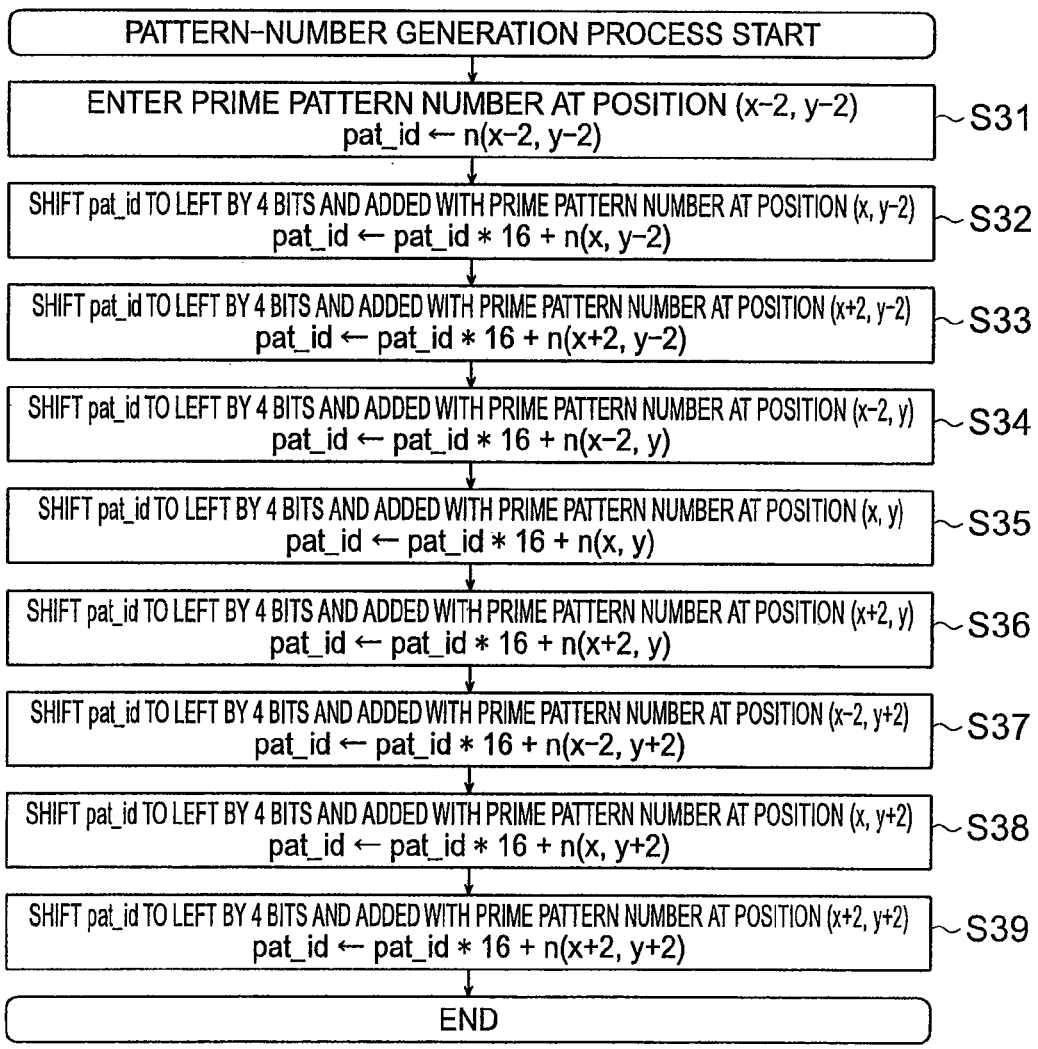
FIG. 6 is a view showing one example of a pixel block.
FIG. 7 is a flowchart indicating one example of a pattern-number generation process.

FIG. 6 is a view showing one example of a pixel block. The nine pieces in total of the prime pattern numbers in the pixel block are n(x−2, y−2), n(x, y−2), n(x+2, y−2), n(x−2, y), n(x, y), n(x+2, y), n(x−2, y+2), n(x, y+2), and n(x+2, y+2). Each prime pattern number is expressed by four bits. A bit string of 36 bits in total that is a string of nine of these 4-bit prime pattern numbers is a pattern number. The pattern number is expressed by the following equation.

$$\text{Pattern number} = n(x-2,y-2) \times 2^{32} + n(x,y-2) \times 2^{28} + n(x+2, y-2) \times 2^{24} + n(x-2,y) \times 2^{20} + n(x,y) \times 2^{16} + n(x+2,y) \times 2^{12} + n(x-2,y+2) \times 2^{8} + n(x,y+2) \times 2^{4} + n(x+2,y+2) \quad (5)$$

As understood from the equation (5), the pattern number takes a value in the range from 0 to $2^{36}-1$.

The pattern detection part 11 generates pattern information that is a pair of a pattern number expressed by the equation (5) and a pattern position that indicates the position of a pixel block of this pattern number in an image. The pattern information is sent to the pattern storage part 12.

FIG. 7 is a flowchart indicating one example of the pattern-number generation process described above. Firstly, a prime pattern number n(x−2, y−2) at a position (x−2, y−2) is entered in pat_id (step S31). Next, pat_id is shifted to left by four bits and added with a prime pattern number at a position (x, y−2) (step S32). Then, pat_id is shifted to left by four bits and added with a prime pattern number at a position (x+2, y−2) (step S33). Next, pat_id is shifted to left by four bits and added with a prime pattern number at a position (x−2, y) (step S34). Then, pat_id is shifted to left by four bits and added with a prime pattern number at a position (x, y) (step S35). Next, pat_id is shifted to left by four bits and added with a prime pattern number at a position (x+2, y) (step S36). Then, pat_id is shifted to left by four bits and added with a prime pattern number at a position (x−2, y+2) (step S37). Next, pat_id is shifted to left by four bits and added with a prime pattern number at a position (x, y+2) (step S38). Then, pat_id is shifted to left by four bits and added with a prime pattern number at a position (x+2, y+2) (step S39).

By the above description, the outline of the operation of the pattern detection part 11 has been explained. However, it is also preferable to generate a plurality of types of pattern information from one pixel block. This requires a plurality of types of pre-processors that generate prime pattern numbers different from one another.

For example, if a process of generating prime pattern numbers with d=Sum/8 in the equation (2) is added, a plurality of types of prime pattern numbers can be generated for the same image. This results in that the pattern number can be changed for generation of a plurality of types of pattern information.

Change in d described above means change in the criteria on the determination as to whether edge information is contained in an image. For example, when d is made larger, the threshold of difference in luminance that is determined to be an edge becomes larger. This results in that a clearer edge only reflects on the bits of a pattern number. Therefore, the effect of noise is minimized so that the accuracy of match-point detection becomes higher for images with much noise.

As described above, pattern numbers, the number of appearance of the same pattern number, and information on the pattern position corresponding to each pattern number are stored for each of a plurality of allowances (threshold levels) d. Therefore, satisfactory results of match-point detection are obtained for any images.

For example, for an image of much noise and taken by high-speed imaging, d is affected by noise if it is smaller, and hence a larger d is preferable. However, merely setting d to a larger value may not contribute accurate detection of edges for an image with less noise but an obscure edge. In order to satisfy the two demands, it is preferable to set two types of pattern numbers obtained with a smaller d and obtained with a larger d, which are not duplicated with each other, for the same image. For example, a pattern number obtained with a smaller d is set to a value in the range from 0 to $2^{36}-1$ and a pattern number obtained with a larger d is set to a value in the range from $2^{36}$ to $2^{37}-1$. In this way, the two pattern numbers are not duplicated with each other. Accordingly, two types of pattern numbers can be generated for the same image according to two different standards. This serves to accurately detect edges even if obscure, with less effect of noise.

In the example described above, two types of non-duplicated pattern numbers are generated by changing the value d. It is also preferable to generate a plurality of types of non-duplicated pattern numbers by means of completely different algorithms. The match-point detection performed with a plurality of types of pattern numbers generated by these different algorithms gives advantages combining advantages each given by the match-point detection performed with pattern numbers generated by the respective algorisms.

As described above, the pattern detection part 11 performs a pattern detection process by each pixel block including 3×3 prime pattern numbers. Each prime pattern number is a 4-bit string generated under consideration of edge information surrounding four pixels. Therefore, in this embodiment, the pattern detection process is performed by each pixel block of six pixels in the vertical direction and six pixels in the horizontal direction.

When the pattern detection part 11 has completed the process for one pixel block, it performs the pattern detection process for the succeeding pixel block. In this case, it is preferable to shift a pixel block by a specific number of pixels to set a new pixel block. It is also preferable to set a new pixel block so that it is not overlapped with a former pixel block for simplified and high-speed processing.

Nevertheless, when it is supposed that an object moves by only one pixel in an image, the pattern detection process has to be performed while a pixel block is shifted by one pixel in order to accurately detect the movement of the object. Therefore, when a pixel block is shifted by a fewer number of pixels to set a new pixel block, it is preferable to provide pre-image processing such as low-pass filtering.

The prime pattern number is not necessarily a 4-bit string. Moreover, the prime pattern number may be detected by using pixel information about pixels except the surrounding four pixels. In addition, the size of each pixel block for detecting a pattern number is not necessarily a 3×3 pixel size.

<First Pattern Storing Process>

Figures 8, 9:
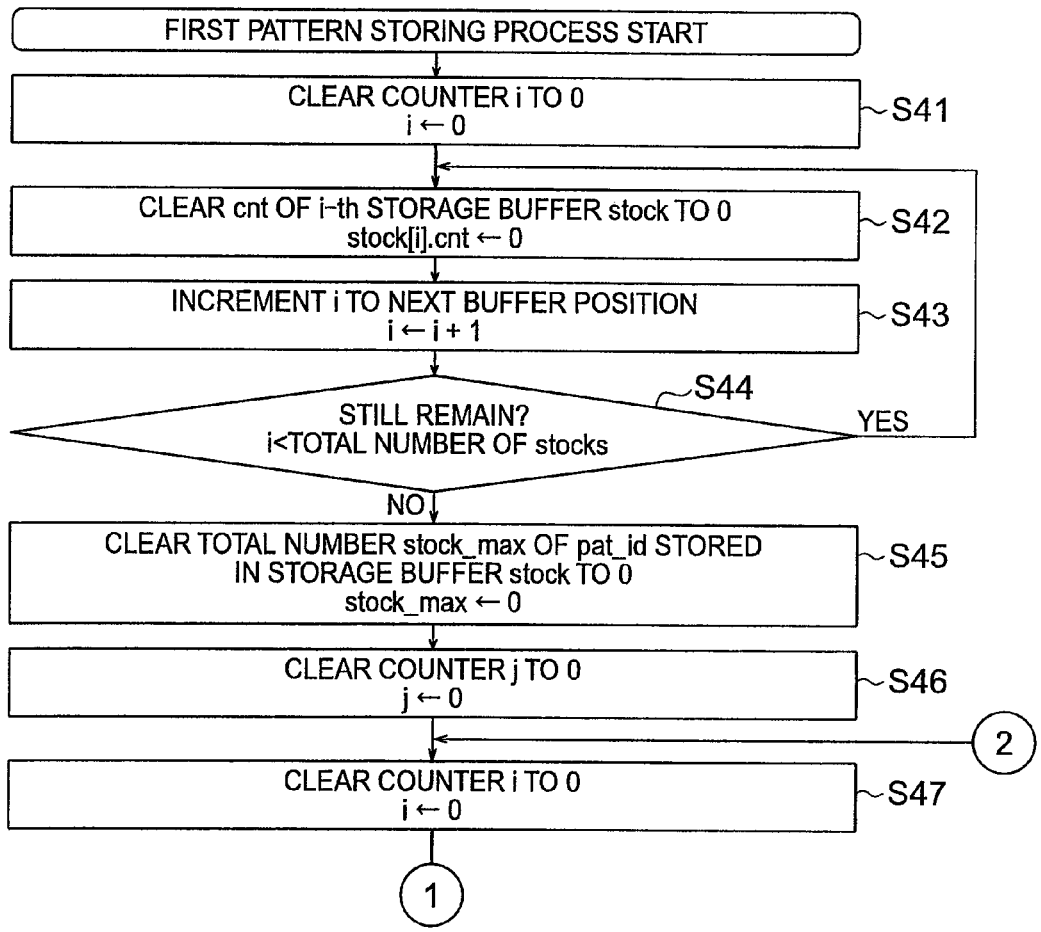
FIG. 8 is a view showing a data format of a storage buffer in a first pattern storing process.
FIG. 9 is a flowchart indicating one example of the first pattern storing process performed by a pattern storage part 12.

Described next is the operation of the pattern storage part 12. The pattern storage part 12 has storage buffers (not shown) for the number of pattern numbers detected by the pattern detection part 11. FIG. 8 is a view showing a data format of a storage buffer in the first pattern storing process. The storage buffer stores a pattern number pat_id, a pattern positions x and y, and a count value cnt that indicates how many times pattern information of the same pattern number has been stored.

The count value cnt of each storage buffer is initialized to zero before starting the storage of pattern information. When pattern information is stored in a storage buffer, it is confirmed whether pattern information of the same pattern number has already been stored. This confirmation step is performed by determining whether the count value cnt is zero or not. If pattern information of the same pattern number has already been stored, or the count value cnt is not zero, the count value cnt is incremented. In this specification, increasing a numerical value by one is referred to as "increment".

If the count value cnt is zero, a new pattern number pat_id and the corresponding pattern positions x and y are stored in a storage buffer, and the count value cnt is set to 1.

The process described above is repeated and when the pattern information and count value cnt for all pixel blocks in an image is stored in a storage buffer, the pattern storing process ends.

Figure 10:
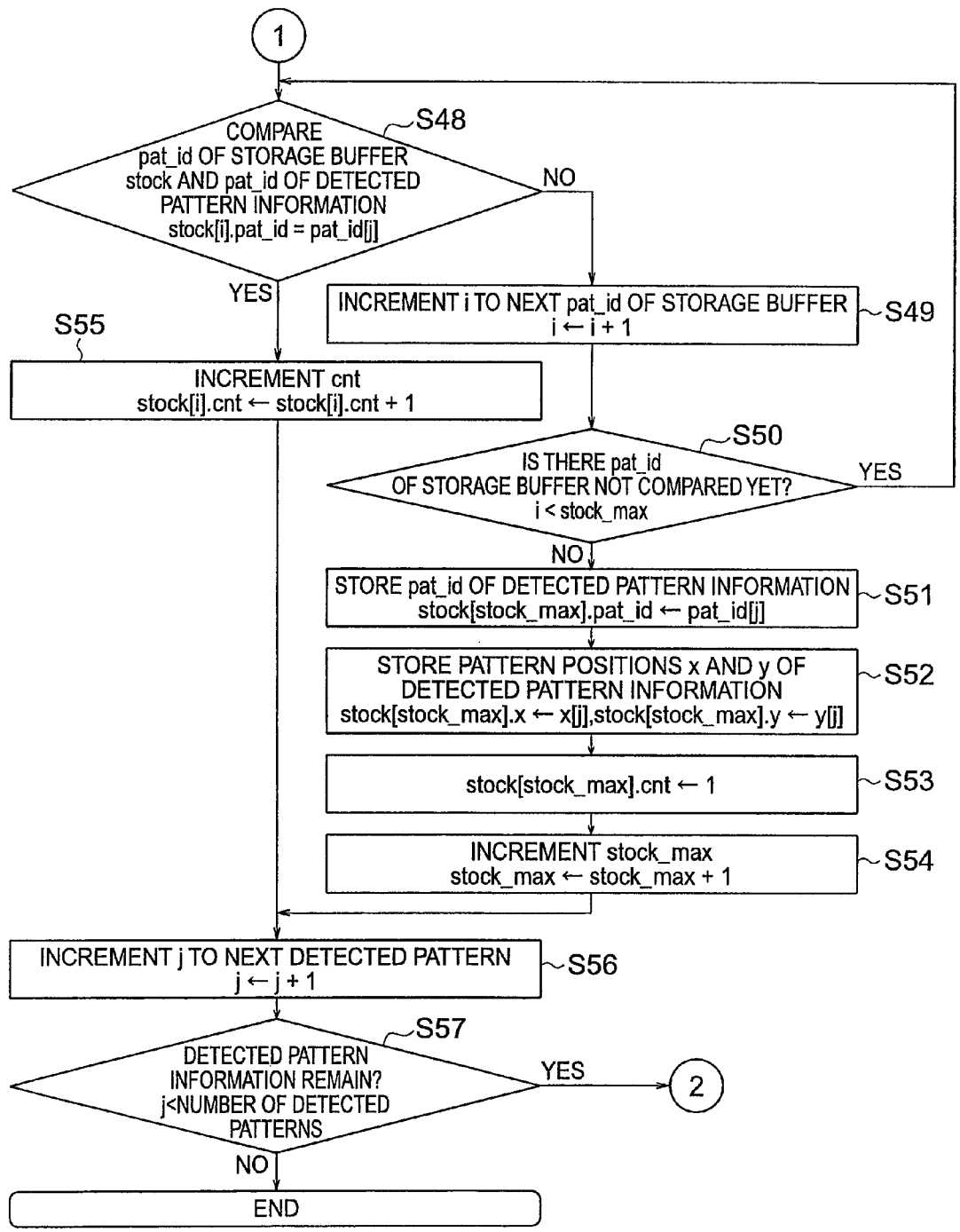
FIG. 10 is a flowchart following to FIG. 9.

FIGS. 9 and 10 are flowcharts indicating one example of the first pattern storing process performed by the pattern storage part 12. Firstly, a variable i that represents a position in a storage buffer is initialized to zero (step S41). Next, a count value cnt of an i-th storage buffer stock is initialized to zero (step S42). Then, the variable i is incremented (step S43). It is then determined whether the variable i is smaller than the total number of storage buffers stock (step S44). If the former is smaller, the process returns to step S42 to initialize the count values cnt of the remaining storage buffers stock.

If the variable i is equal to or larger than the total number of the storage buffers stock, a total number stock_max of pattern numbers pad_id stored in the storage buffers stock is initialized to zero (step S45).

Next, a variable j that represents a position on a pattern number detected by the pattern detection part 11 is initialized to zero (step S46). The variable i is then initialized again to zero (step S47).

As described above, initialization is performed for all of the storage buffers stock in steps S41 to S47.

Next, it is determined whether a pattern number pad_id detected by the pattern detection part 11 is identical to a pattern number pad_id of the i-th storage buffer stock (step S48). If not identical, the variable i is incremented in order to detect the succeeding storage buffer stock (step S49).

Next, it is determined whether there is a pattern number pad_id of a storage buffer stock that has not undergone the comparison (step S50). If there is, the procedure returns to step S48. If not, a pattern number pad_id detected by the pattern detection part 11 is stored in a new storage buffer (step S51). Next, a pattern position corresponding to that pattern number pad_id is stored in the same storage buffer (step S52). Then, a count value cnt of that storage buffer is set to 1 (step S53). Next, a total number stock_max of the storage buffers is incremented (step S54).

On the contrary, if it is determined as identical in step S48, a count value cnt of a storage buffer is incremented (step S55).

When step S54 or S55 ends, the variable j is incremented (step S56).

Next, it is determined whether the total number of pattern numbers detected by the pattern detection part 11 is larger than the variable j (step S57). If the former is larger, step S47 and the succeeding steps are performed. If the former is not larger, the storage process ends.

<Second Pattern Storing Process>

Each storage buffer in the pattern storage part 12 described above stores information of FIG. 8. However, the information to be stored is not necessarily limited to that of FIG. 8. FIG. 11 is a view showing a data format of a storage buffer in the second pattern storing process. The storage buffer of FIG. 11 has a pattern number pat_id, a maximum value max_x of a pattern position x, a maximum value max_y of a pattern position y, a minimum value minx of the pattern position x, a minimum value min_y of the pattern position y, a summed-up value sum_x of the pattern position x, a summed-up value sum_y of the pattern position y, and a count value indicating the number of times of storage.

The number of storage buffers provided in this case also corresponds to the number of pattern numbers detected by the pattern detection part 11. Before starting storage in the storage buffers, the count values cnt of all of the storage buffers are initialized to zero.

When pattern information is stored in the storage buffers, the pattern storage part 12 checks whether pattern information of the same pattern number has already been stored. If already stored, the pattern storage part 12 adds pattern positions x and y to be newly stored, to sum_x and sum_y, respectively. If the pattern position x is larger than the maximum value max_x, the pattern storage part 12 replaces max_x with x. If the pattern position y is larger than the maximum value max_y, the pattern storage part 12 replaces max_y with y. In the same way, if the pattern position x is smaller than the minimum value min_x, the pattern storage part 12 replaces min_x with x. And, if the pattern position y is smaller than the minimum value min_y, the pattern storage part 12 replaces min_y with y. Moreover, the pattern storage part 12 increments the count value cnt.

When the check indicates that no information has been stored, the pattern storage part 12 stores pattern number pat_id to be stored in pat_id of a new storage buffer, a pattern position x to be stored in all of sum_x, max_x and min_x, and a pattern position y to be stored in all of sum_y, max_y and min_y. Moreover, the pattern storage part 12 sets the count value cnt to 1.

When the pattern information has been stored for all pixel blocks of an image in the way as described above, the pattern storing process ends.

Figure 12:
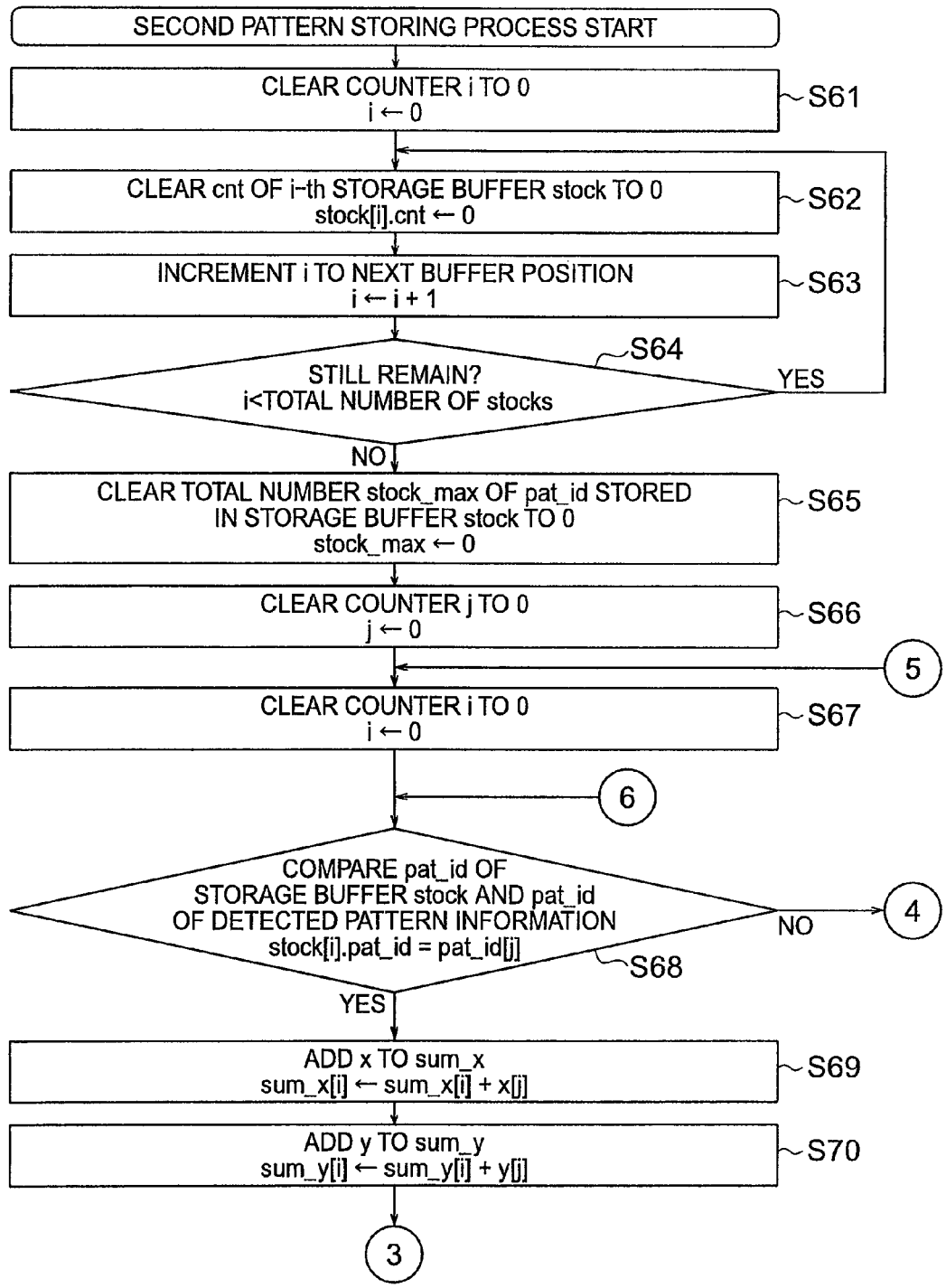
FIG. 12 is a flowchart indicating one example of the second pattern storing process performed by the pattern storage part 12.
Figure 13:
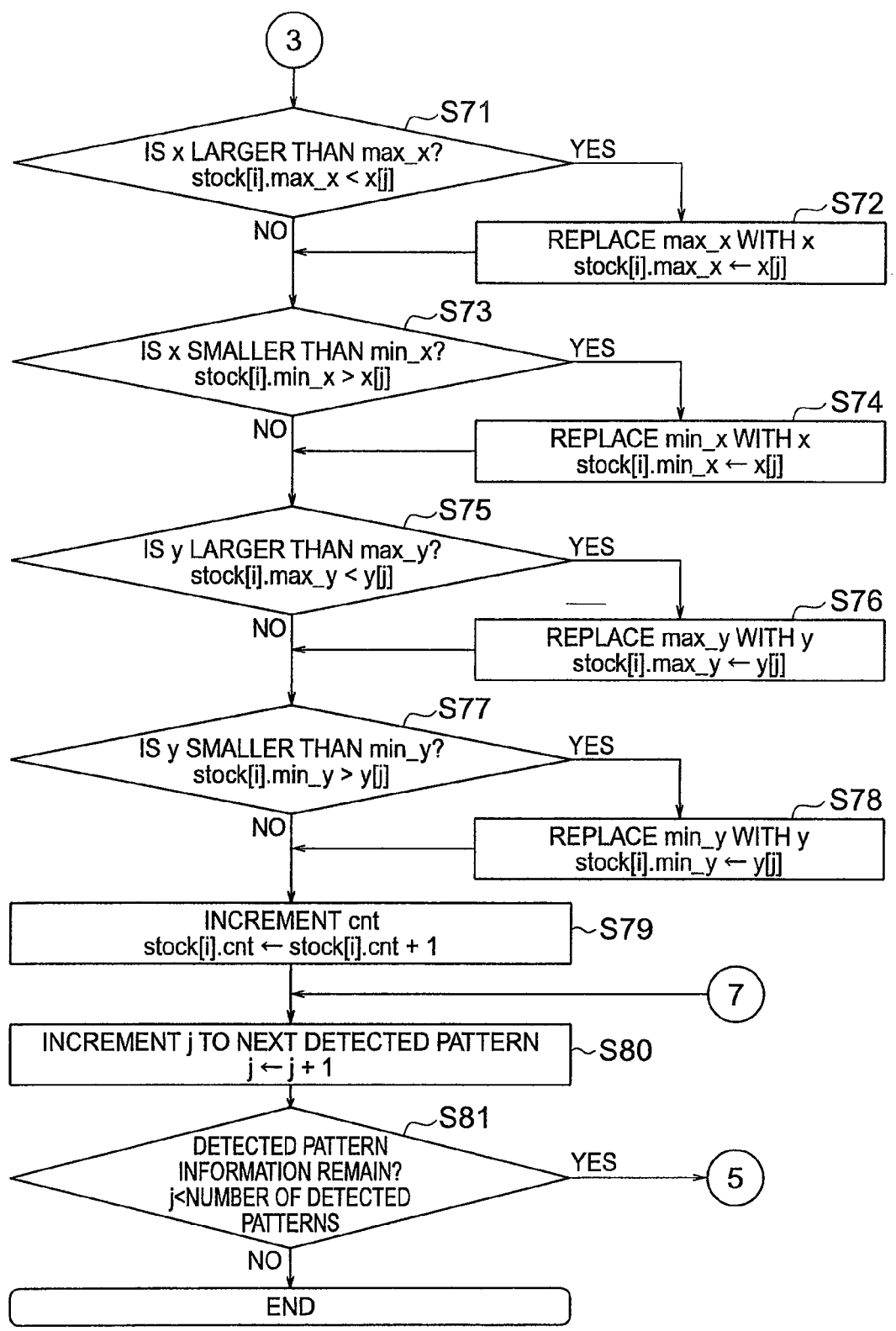
FIG. 13 is a flowchart following to FIG. 12.
Figure 14:
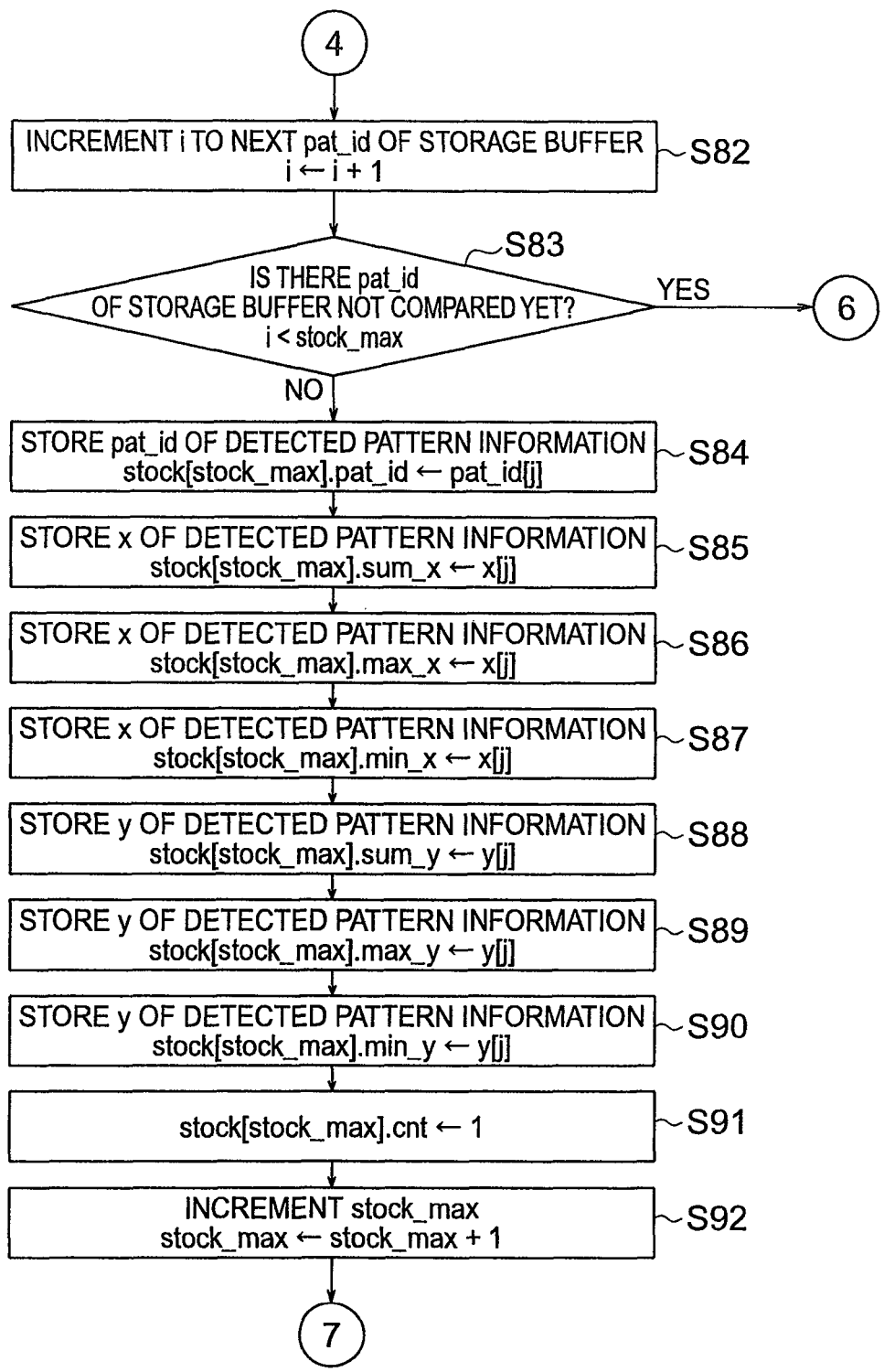
FIG. 14 is a flowchart following to FIG. 13.

FIGS. 12 to 14 are flowcharts indicating one example of the second pattern storing process performed by the pattern storage part 12. Firstly, a variable i that represents a position on a storage buffer is initialized to zero (step S61). Next, a count value cnt of an i-th storage buffer stock is initialized to zero (step S62). Then, the variable i is incremented (step S63). It is then determined whether the variable i is smaller than the total number of storage buffers stock (step S64). If smaller than the total number, the process returns to step S62.

If it is determined in step S64 that the variable i has reached the total number, a total number stock_max of pattern numbers is initialized to zero (step S65). Next, a variable j that indicates a position on a pattern number detected by the pattern detection part 11 is initialized to zero (step S66). The variable i is then initialized again to zero (step S67).

Next, it is determined whether a pattern number pad_id detected by the pattern detection part 11 is identical to a pattern number pad_id of a storage buffer stock (step S68). If identical, a pattern position x detected by the pattern detection part 11 is added to sum_x (step S69). And, a pattern position y detected by the pattern detection part 11 is added to sum_y (step S70).

Next, it is determined whether the pattern position x detected by the pattern detection part 11 is larger than max_x (step S71). If larger, max_x is replaced with x (step S72).

Next, it is determined whether the pattern position x detected by the pattern detection part 11 is smaller than minx (step S73). If smaller, min_x is replaced with x (step S74).

Next, it is determined whether the pattern position y detected by the pattern detection part 11 is larger than max_y (step S75). If larger, max_y is replaced with y (step S76).

Next, it is determined whether the pattern position y detected by the pattern detection part 11 is smaller than min_y (step S77). If smaller, min_y is replaced with y (step S78).

Next, a count value cnt of the storage buffer stock is incremented (step S79). Then, the variable j is incremented (step S80).

It is then determined whether the total number of pattern numbers detected by the pattern detection part 11 is larger than the variable j (step S81). If not larger, the process ends whereas if larger, step S67 and the succeeding steps are performed.

On the contrary, if it is determined as not identical in step S68, the variable i is incremented (step S82). Next, it is determined whether there is a storage buffer that has not undergone the comparison with a pattern number of pattern information detected by the pattern detection part 11 (step S83). If there is, step S68 and the succeeding steps are performed. If not, a pattern number pad_id detected by the pattern detection part 11 is stored in a storage buffer (step S84) and the corresponding pattern position x is stored in sum_x, max_x and min_x (steps S85 to S87). And, the corresponding pattern position y is stored in sum_y, max_y and min_y (steps S88 to S90). Next, the count value cnt is set to 1 (step S91). A variable stock_max that indicates the type of storage buffer is incremented (step S92). And then, step S80 and the succeeding steps are performed.

<Third Pattern Storing Process>

Instead of storing the maximum and minimum values of pattern positions x and y as performed in the second pattern storing process, a summed-up value sum_x2 of the square of a pattern position x and a summed-up value sum_y2 of the square of a pattern position y may be stored.

Figures 15, 16:
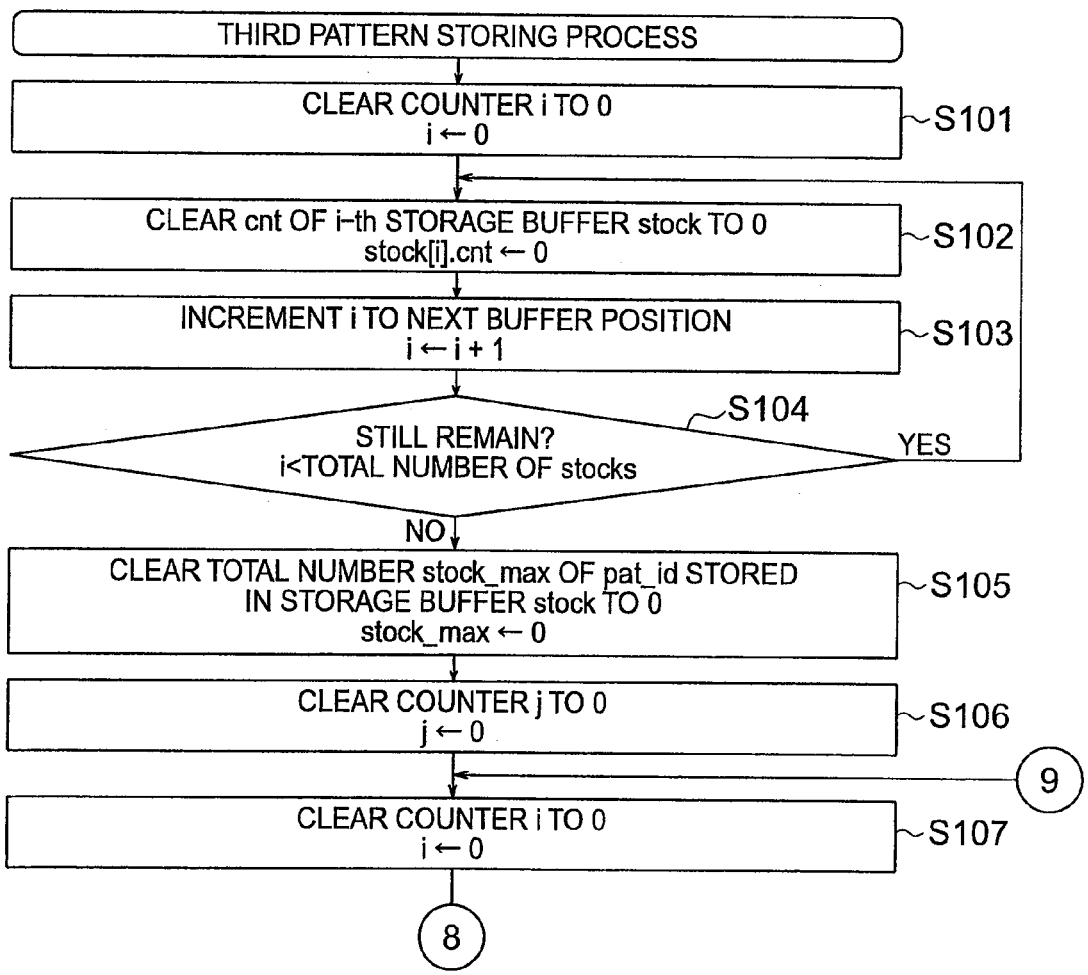
FIG. 15 is a view showing a data format of a storage buffer in a third pattern storing process.
FIG. 16 is a flowchart indicating one example of the third pattern storing process performed by the pattern storage part 12.

FIG. 15 is a view showing a data format of a storage buffer in the third pattern storing process. As shown, the storage buffer has a pattern number pat_id, a summed-up value sum_x of a pattern position x, a summed-up value sum_y of a pattern position y, a summed-up value sum_x2 of the square of the pattern position x and a summed-up value sum_y2 of the square of the pattern position y, and a count value cnt that indicates how many times data has been stored in the storage buffer.

When there is data already stored in a storage buffer, the pattern storage part 12 adds pattern positions x and y to sum_x and sum_y, respectively, adds the square of x to sum_x2, adds the square of y to sum_y2, and then increments the count value cnt.

For a pattern number still not stored in the storage buffer, the pattern storage part 12 stores pad_id of pattern information to be stored in a pattern number pad_id of a new storage buffer, stores pattern positions x and y of the pattern information to be stored to sum_x and sum_y, respectively, stores the square of x and the square of y of the pattern information to be stored in sum_x and sum_y, respectively, and then set cnt to 1. When pattern information of every position in an image has been stored, the pattern storing process ends.

Figure 17:
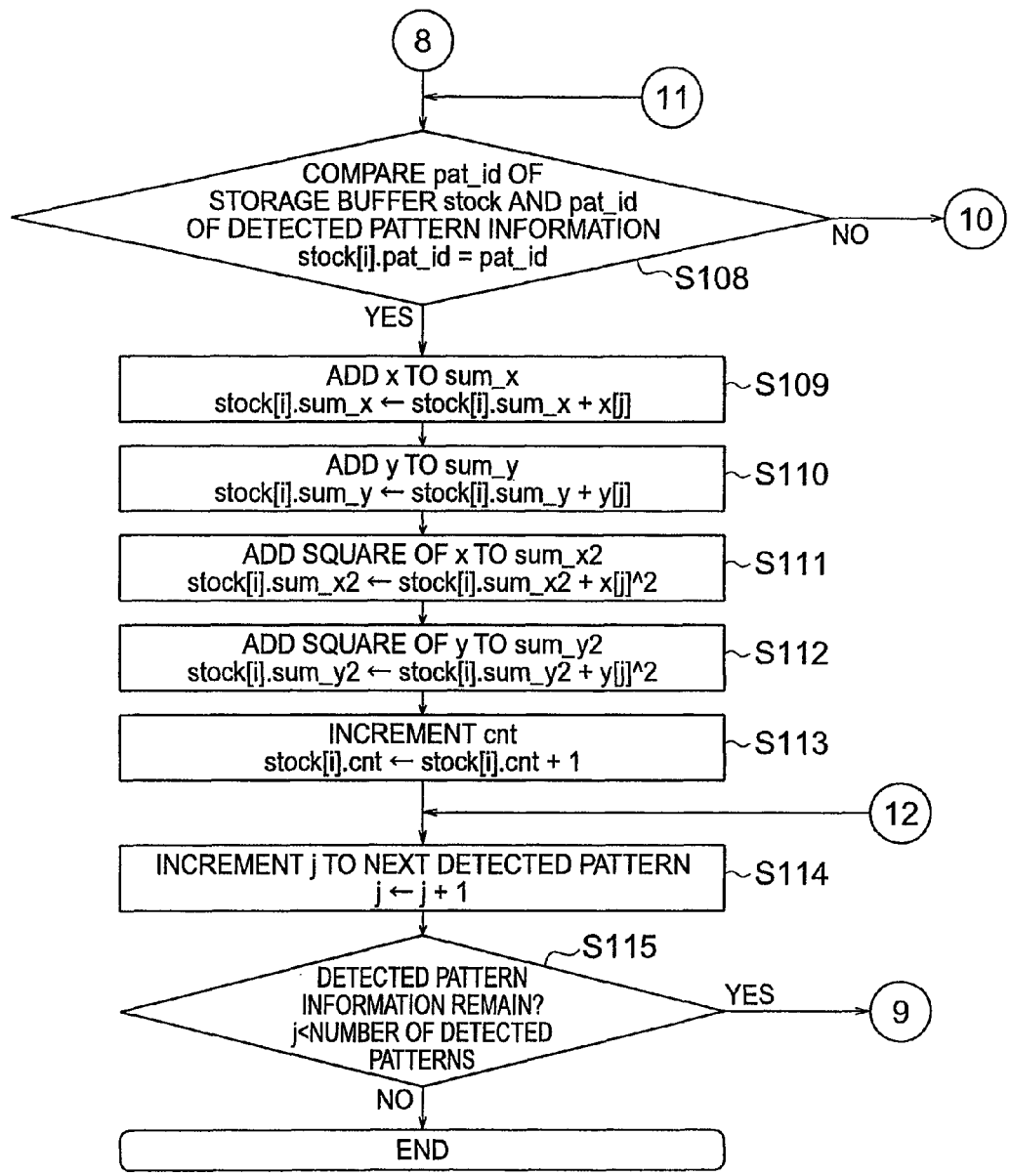
FIG. 17 is a flowchart following to FIG. 16.
Figure 18:
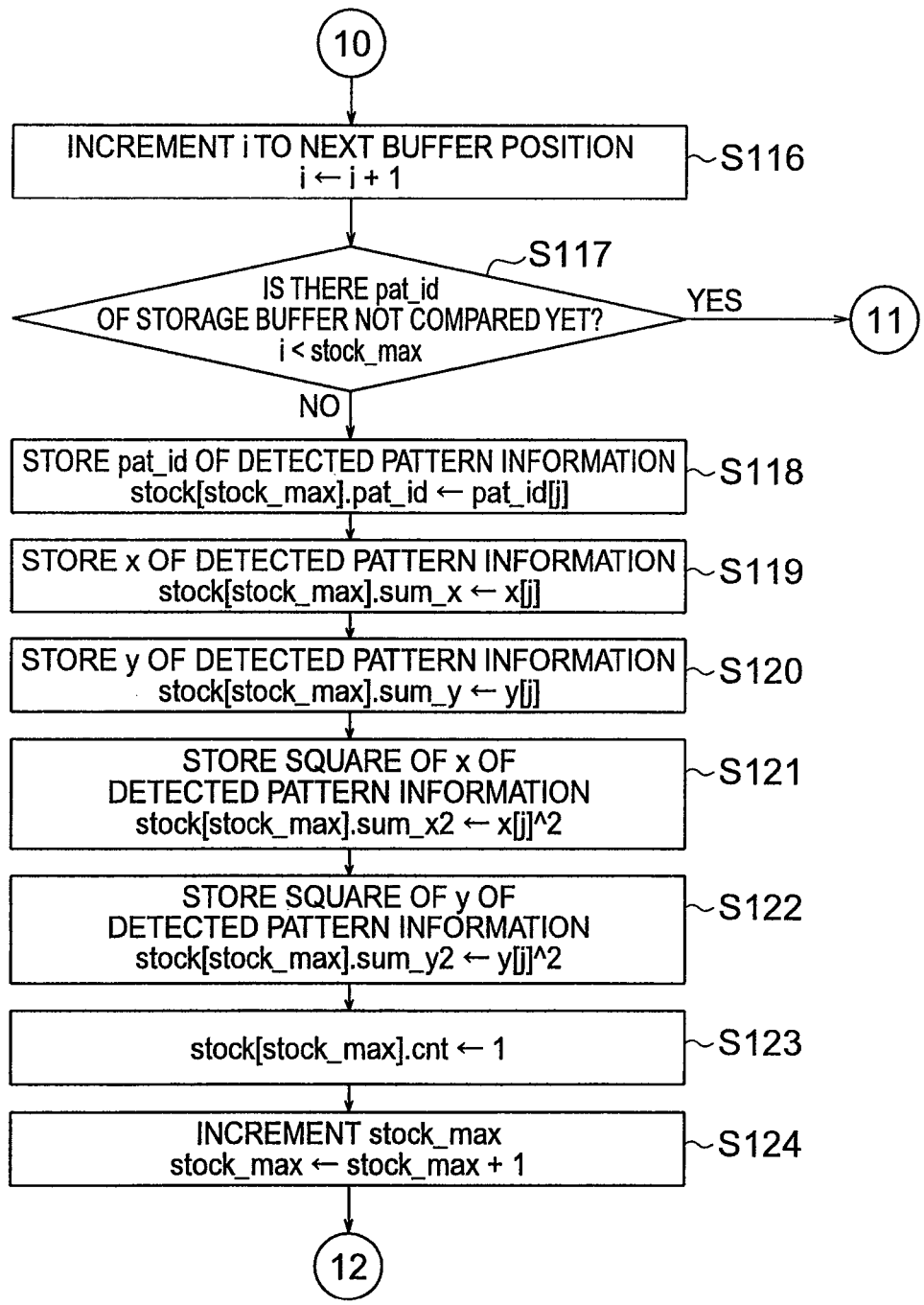
FIG. 18 is a flowchart following to FIG. 17.

FIGS. 16 to 18 are flowcharts indicating one example of the third pattern storing process performed by the pattern storage part 12. Step S101 to S110 and Step S61 to S70 of FIGS. 12 and 13 are common to each other, and hence the explanation of the former steps is omitted.

When step S110 ends, the square of a pattern position x is added to sum_x2 (step S111). Next, the square of a pattern position y is added to sum_y2 (step S112). Step S113 to S119 and Step S79 to S85 of FIGS. 13 and 14 are common to each other, and hence the explanation of the former steps is omitted.

When step S119 ends, the corresponding pattern position y is stored in sum_y (step S120). The square of the corresponding pattern position x is stored in sum_x2 (step S121). The square of the corresponding pattern position y is stored in sum_y2 (step S122). After that, a count value cnt is initialized to 1 (step S123). An variable stock_max that indicates the type of storage buffer is incremented (step S124).

After step S124, the process moves to step S114.

By the above description, the operation of the pattern storage part 12 is finished. Described next is the operation of the characteristic-point extraction part 13. There are first, second, and third characteristic-point extraction processes, as described below.

<First Characteristic-Point Extraction Process>

The first characteristic-point extraction process corresponds to a storage buffer having the data format of FIG. 8. The first characteristic-point extraction process is performed after the first pattern storing process. The characteristic-point extraction part 13 scans a storage buffer having the data format of FIG. 8 to extract information of a count value cnt=1, and then stores the information in a characteristic-point buffer (not shown).

Figures 19, 20:
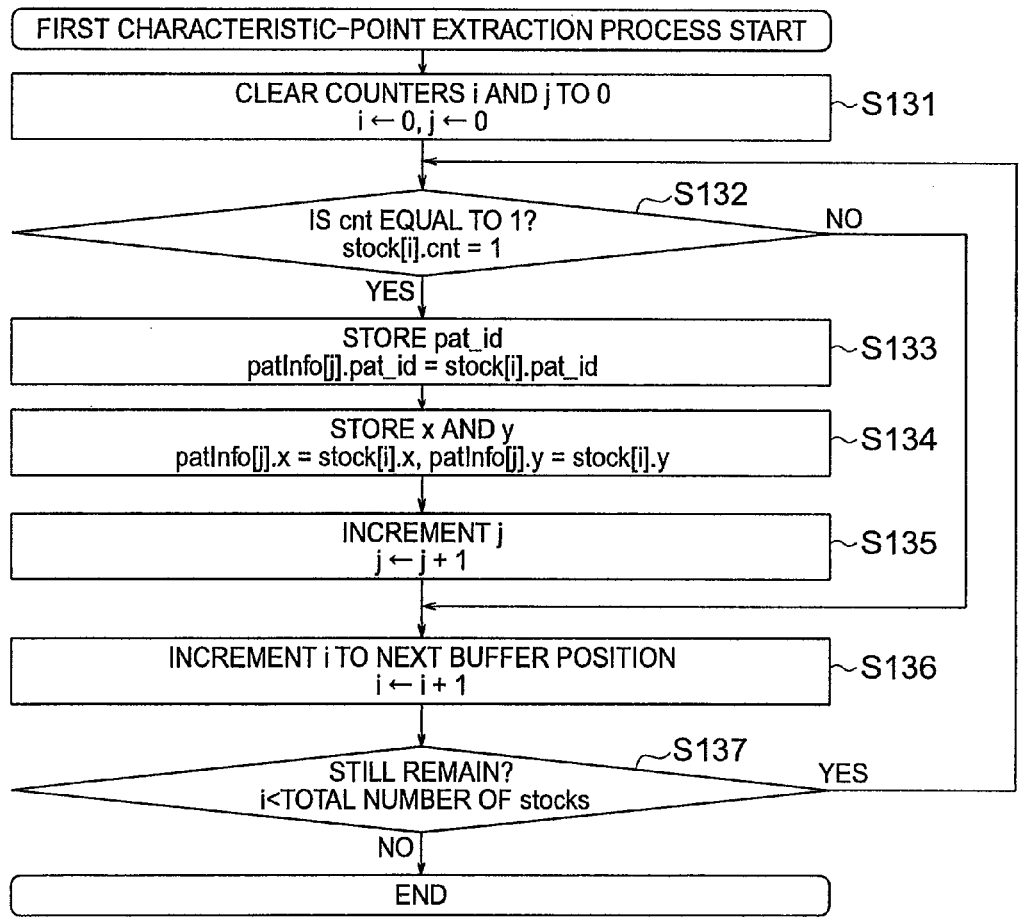
FIG. 19 is a view showing a data format of a characteristic-point buffer in a first characteristic-point extraction process.
FIG. 20 is a flowchart indicating one example of the first characteristic-point extraction process.

FIG. 19 is a view showing a data format of a characteristic-point buffer in the first characteristic-point extraction process. To the characteristic-point buffer of FIG. 19, a pattern number patid, a pattern position x, and a pattern position y are stored.

FIG. 20 is a flowchart indicating one example of the first characteristic-point extraction process. Firstly, a variable i that indicates a position on a storage buffer stock and a variable j that indicates a position on a characteristic-point storage buffer patinfo are initialized to zero (step S131).

It is then determined whether a count value cnt in an i-th storage buffer is 1 or not (step S132). If it is 1, a pattern number patid and pattern positions x and y in the i-th storage buffer are stored in the characteristic-point storage buffer patinfo (steps S133, S134). Next, the variables j and i are incremented (steps S135, S136).

Next, it is determined whether the variable i is smaller than the total number of storage buffers (step S137). If it is smaller than the total number, the process moves to step S132, and the process ends if it has reached the total number.

<Second Characteristic-Point Extraction Process>

The second characteristic-point extraction process corresponds to a storage buffer having the data format of FIG. 11. The second characteristic-point extraction process is performed after the second pattern storing process. The characteristic-point extraction part 13 scans a storage buffer having the data format of FIG. 11 to extract a storage buffer having a count value cnt=1 or a storage buffer that satisfies the flowing three conditions. And, the characteristic-point extraction part 13 stores the information in the extracted storage buffer in a characteristic-point buffer.

Information about
1) a count value cnt is equal to 2 or larger
2) maximum value max_x-minimum value min_x<dx
3) maximum value max_y-minimum value min_y<dy The data format of the characteristic-point buffer in the second characteristic-point process is the same as shown in FIG. 19. Nevertheless, stored at a pattern position x is a value sum_x/cnt obtained by dividing a sum total sum_x of pattern positions x by a count value cnt. And, stored at a pattern position y is a value sum_y/cnt obtained by dividing a sum total sum_y of pattern positions y by the count value cnt.

The above-described dx and dy are threshold values for determining whether a pattern is a characteristic point. If there are identical patterns in separated parts of an image, the patterns are eliminated because it is highly likely that the patterns do not function as a characteristic point. In contrast, if there are identical patterns only in a narrow area of an image, the patterns are determined to be a characteristic point. And, the position obtained by averaging the detected positions of the identical patterns is set as the position of the patterns.

This process is the measure against the fact that identical patterns are often found at close positions in an obscure part of defocus.

For example, in the case of combining a plurality of images or the like, it is preferable to apply numerical values for example from 1 to 5 to dx and dy if it is necessary to detect as many match points as possible in the entire image for further accurate image matching.

In the case where it is not needed to detect so many match points for correction of blurred images due to hand shaking or the like, when dx and dy are set to zero, pixels existing only in one part of an image are extracted. This is equivalent to the first characteristic-point extraction process, and hence it is preferable to perform the first characteristic-point extraction process with a low process cost.

Figure 21:
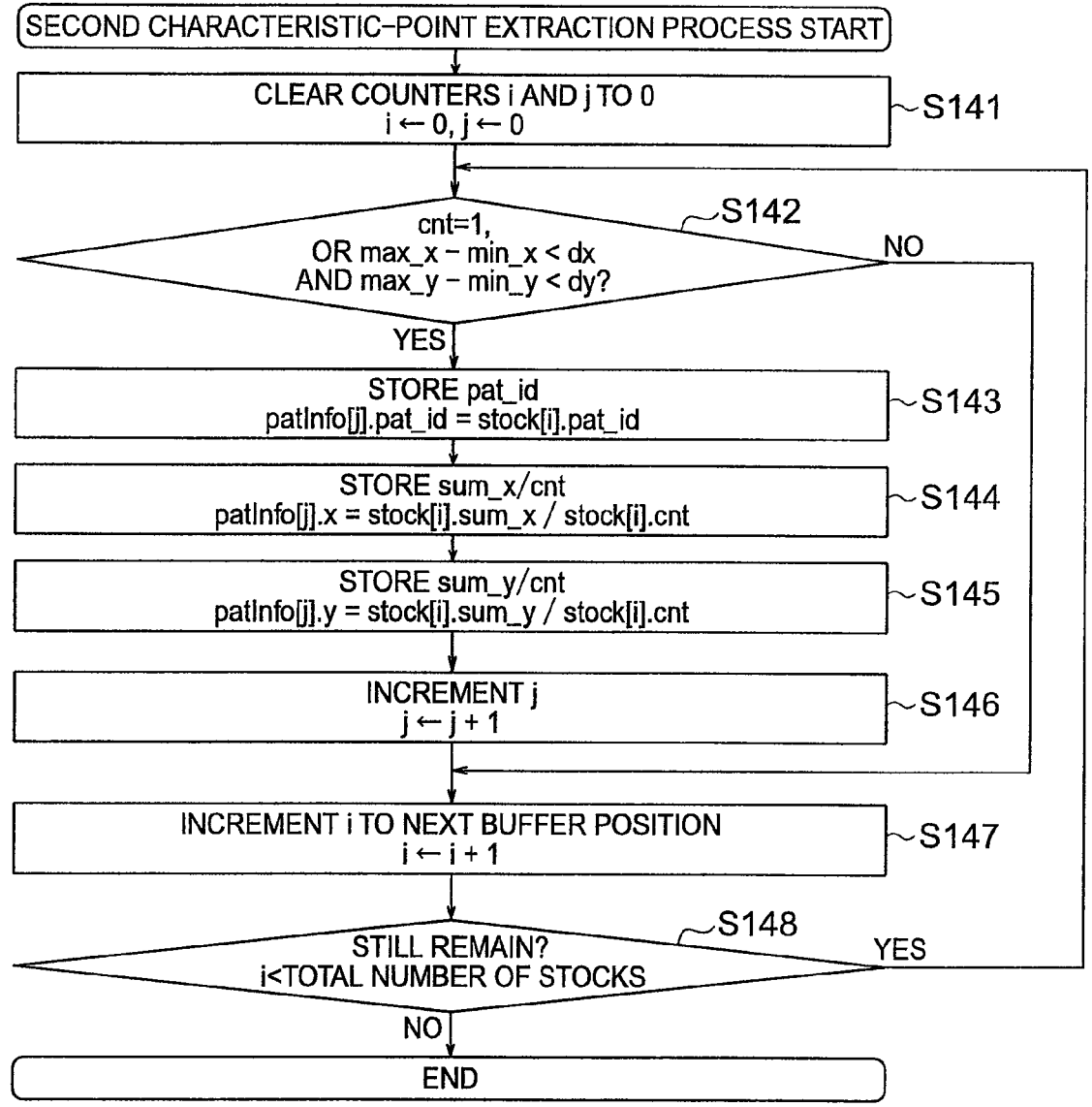
FIG. 21 is a flowchart indicating one example of a second characteristic-point extraction process.

FIG. 21 is a flowchart indicating one example of the second characteristic-point extraction process. Firstly, a variable i that indicates a position on a storage buffer stock and a variable j that indicates a position on a characteristic-point buffer patinfo are initialized to zero (step S141).

It is then determined whether a count value cnt in an i-th storage buffer is 1, or max_x-min_x<dx and max_y-min_y<dy (step S142). If YES in the determination of step S142, a pattern number pat_id in the i-th storage buffer is stored in a j-th characteristic-point buffer patinfo (step S143). Next, sum_x/cnt and sum_y/cnt calculated by using the information in the same storage buffer stock are stored in the same characteristic-point buffer patinfo (steps S144, S145).

Next, the variables j and i are incremented (steps S146, S147). Next, it is determined whether the variable i has reached the total number of storage buffers (step S148). If it has not reached, step S142 and the succeeding steps are performed, whereas if it has reached, the process ends.

<Third Characteristic-Point Extraction Process>

The third characteristic-point extraction process corresponds to a storage buffer having the data format of FIG. 15. The third characteristic-point extraction process is performed after the third pattern storing process. The characteristic-point extraction part 13 scans a storage buffer having the data format of FIG. 15 to extract a storage buffer having a count value cnt of 1 or a storage buffer that satisfies the flowing three conditions. And, the characteristic-point extraction part 13 stores the information in the extracted storage buffer in a characteristic-point buffer.

1) a count value cnt is equal to 2 or larger
2) standard deviation stdev_x=√((cnt*sum_x2−sum_x*sum_x)/cnt/(cnt−1)<dx
3) standard deviation stdev_y=√((cnt*sum_y2−sum_y*sum_y)/cnt/(cnt−1)<dy The data format of the characteristic-point buffer in the third characteristic-point process is the same as shown in FIG. 19. Nevertheless, stored in pattern positions x and y are sum_x/cnt and sum_y/cnt, respectively, hence the same as the second characteristic-point process.

In the same way as the second characteristic-point process, the third characteristic-point process determines the identical patterns as a characteristic point if the patterns exist only at the locations close to one another. In order to determine whether the locations are close to one another, the standard deviations stdev_x and stdev_y of the positions x and y are compared with threshold values. This is a characteristic of the third characteristic-point extraction process different from the second characteristic-point extraction process.

Figure 22:
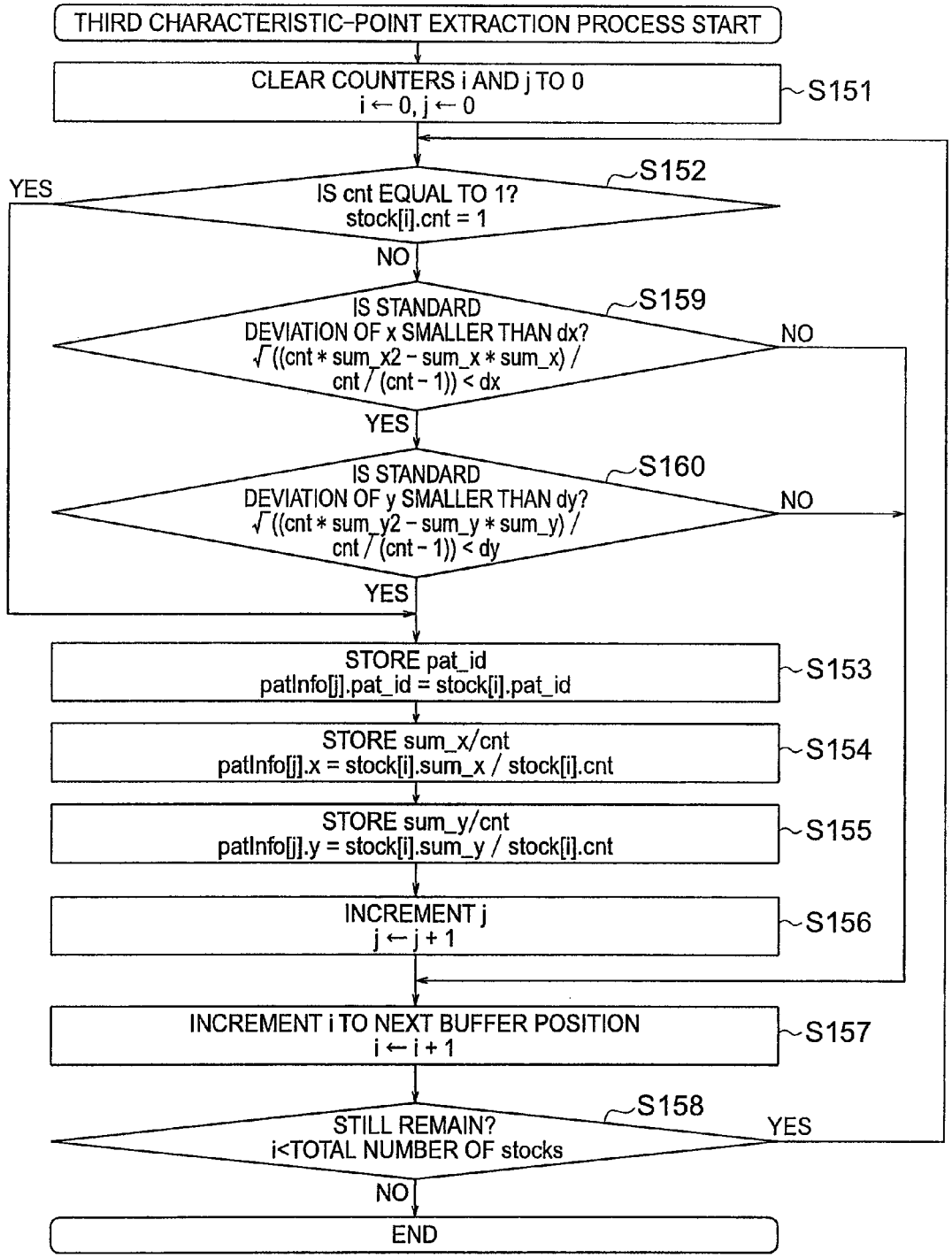
FIG. 22 is a flowchart indicating one example of a third characteristic-point extraction process.

FIG. 22 is a flowchart indicating one example of the third characteristic-point extraction process. Firstly, a variable i that indicates the type of a storage buffer stock and a variable j that indicates the type of a characteristic-point buffer patinfo are initialized to zero (step S151).

It is then determined whether a count value cnt in an i-th storage buffer stock is 1 or not (step S152). If it is 1, a pattern number pat_id, sum_x/cnt and sum_y/cnt in the i-th storage buffer are stored in a j-th characteristic-point buffer (steps S153 to S155).

Next, the variables i and j are incremented (steps S156, S157). Next, it is determined whether the variable i has reached the total number of storage buffers (step S158). If it has not reached, the process returns to step S152 whereas if it has reached, the process ends.

On the contrary, if it is determined as not be 1 in step S152, it is determined that the standard deviation stdev_x=√((cnt*sum_x2−sum_x*sum_x)/cnt/(cnt−1) is smaller than dx (step S159). If YES in the determination, it is determined that the standard deviation stdev_y=√((cnt*sum_y2−sum_y*sum_y)/cnt/(cnt−1) is smaller than dy (step S160).

If it is determined as YES in step S160, the process moves to step S153. If it is determined as NO in step S159 or S160, the process moves to step S157.

By the first, second or third characteristic-point extraction process described above, the data stored in a characteristic-point buffer becomes characteristic-point pattern information patInfo.

<Pattern Observation Probability Calculation Process>

The pattern storage part 12 described above has been assumed that the storage buffers are provided for the number of all pixels in an bitmap image for detecting a pattern number. However, it is not necessarily required to provide storage buffers for the number of all pixels in a bitmap image. This is because, practically, the pattern information of pixel blocks having the same pattern number is stored in the same storage buffer. In this case, the number of storage buffers may be limited beforehand and the storing process at the pattern storage part 12 ends when all of the storage buffers have been used. Or, the pattern information to be stored in a storage buffer may be restricted beforehand so that only the useful pattern information is stored in a storage buffer.

The number of pieces of pattern information to be stored may be also reduced by predicting observation probability of the pattern numbers in a pixel block and storing only the pattern information related to pattern images with low observation probability. The reason for restricting pattern images with low observation probability is that a pattern number with low observation probability rarely appears and hence it may be probably a characteristic pattern number.

Figures 23, 24:
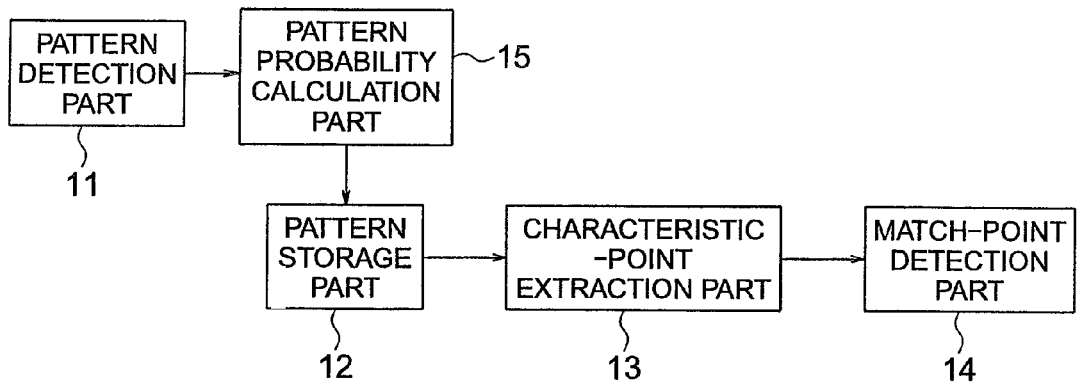
FIG. 23 is a block diagram showing one example of the internal configuration of the image match-point detection apparatus 10 equipped with a pattern probability calculation part 15 that performs a prediction process of an observation probability of a pattern image.
FIG. 24 is a view showing one example of a table indicating the correspondence between prime pattern numbers and observation probabilities.

The prediction of observation probability of such pattern images has to be performed before the pattern storage part 12 described above performs the process. FIG. 23 is a block diagram that shows one example of the internal configuration of the image match-point detection apparatus 10 equipped with a pattern probability calculation part 15. As shown, the pattern probability calculation part 15 is provided between the pattern detection part 11 and the pattern storage part 12, the other configuration being the same as FIG. 2.

The probability of occurrence that the pattern image having a certain pattern number is contained in an image is different image by image. Nevertheless, the pattern probability calculation part 15 is provided for higher speed operation with reduced number of storage buffers. Therefore, it is enough for the pattern probability calculation part 15 to output only the information that indicates whether to store pattern information in a storage buffer.

In this embodiment, a pixel block of 6×6=36 pixels is expressed by a combination of prime pattern numbers of 3×3=9. Therefore, a determination is made as to whether to store the pattern information of that pixel block by comparing with a threshold value, the value obtained by multiplying one another nine probabilities that each of the nine prime pattern numbers is observed.

The prime pattern number can take any numerical value from 0 to 15. Hence, the observation probability of each prime pattern number is obtained beforehand for a typical image and the table of obtained observation probabilities is made. FIG. 24 is a view showing one example of a table that indicates the correspondence between prime pattern numbers and observation probabilities. This kind of table is looked up as a look-up table (LUT, hereinafter) so that observation probabilities can be easily calculated.

Figure 25:
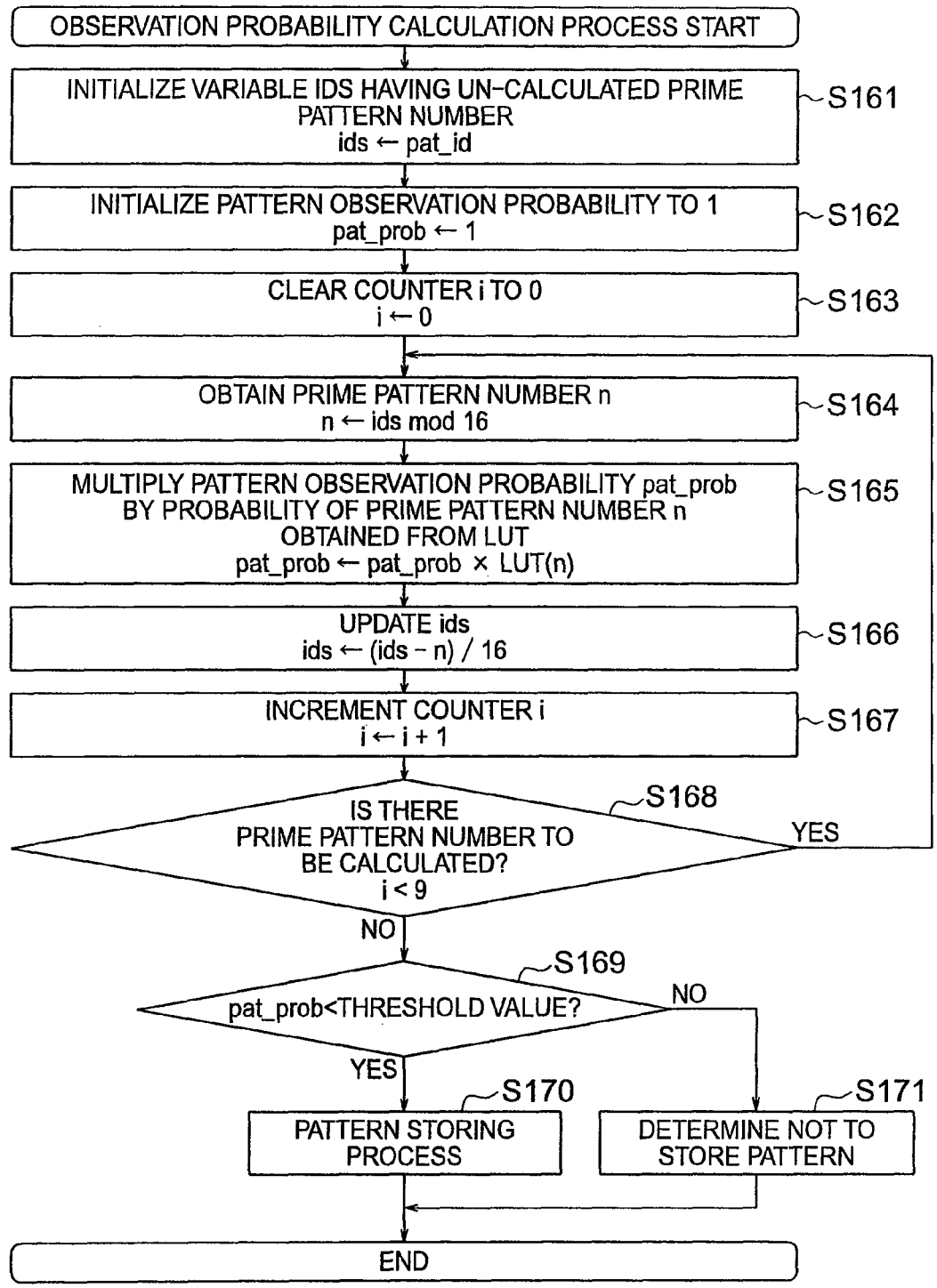
FIG. 25 is a flowchart indicating one example of a process performed by the pattern probability calculation part 15.

FIG. 25 is a flowchart indicating one example of the process performed by the pattern probability calculation part 15. The process of this flowchart is performed for each pixel block for which a pattern number is detected. Firstly, a variable ids that represents the type of prime pattern number is initialized to zero (step S161). A value pat_id of a new prime pattern number is then substituted for the variable ids.

Next, a pattern observation probability pat_prob is initialized to 1 (step S162). And then, a variable i that represents the total number of the prime pattern numbers for which probabilities have been obtained is initialized to zero (step S163).

Next, a remainder obtained by dividing the variable ids by 16 is substituted for the variable n (step S164). A probability LUT(u) corresponding to the variable ids is looked up in the LUT and multiplied by the pattern observation probability pat_prob (step S165). Next, in order to update the variable ids, (ids−n)/16 is substituted for the variable ids (step S166). The variable i is then incremented (step S167).

Next, it is determined whether the variable i has reached the total number of prime pattern numbers (step S168). If not reached, step S164 and the succeeding steps are performed. If the variable i has reached the total number of prime pattern numbers, this indicates that a pattern observation probability pat_prob has been obtained. It is then determined whether the pattern observation probability pat_prob is smaller than a predetermined threshold value (step S169).

If the pattern observation probability pat_prob is smaller than the threshold value, the above-described first, second or third pattern storing process is performed (step S170). If it is equal to or larger than the threshold value, it is determined that the pattern information of the corresponding pixel block is not stored in the pattern storage part 12 (step S171).

In the process of FIG. 25, whether the pattern storage is performed or not is determined in accordance with how the pattern observation probability pat_prob is large. Nevertheless, there are images with many small textures, low-contrast images, dark images such as a night view, and so on. Therefore, in the process of FIG. 25, much pattern information is stored for images with many small pictures, whereas less pattern information is stored for low-contrast images or the like.

In order to use at the maximum storage buffers in the pattern storage part 12, a proper threshold value has to be set for each type of image. This requires an exclusive process to determine a threshold value for each type of image, which is a disadvantage in view of increase in operation speed.

Accordingly, it is assumable to limit use of the storage buffers by classifying the pattern observation probabilities pat_prob obtained in the process of FIG. 25 into several levels (a level classification part) and determining by each level whether to use the storage buffers provided for each level.

In this case, the number of candidates for characteristic-point pattern information to belong to the corresponding level and the lower levels are counted (a characteristic-point candidate counting part). Next, pattern numbers of the candidates for characteristic-point pattern information, the number of times of appearance of the same pattern number, and information on a pattern position corresponding to each pattern number are separately stored in a plurality of storage buffers. In this storing process, if the number counted by the characteristic-point candidate counting part is smaller than a predetermined threshold value, storage in the corresponding storage buffer is allowed. On the contrary, if the number counted by the characteristic-point candidate counting part is equal to or larger than the predetermined threshold value, storage in all storage buffers at the corresponding level or higher (a level of a higher observation probability) is prohibited. FIGS. 26A, 26B, 26C and 26D are flowcharts indicating one example of this kind of storage control process.

Figure 26A:
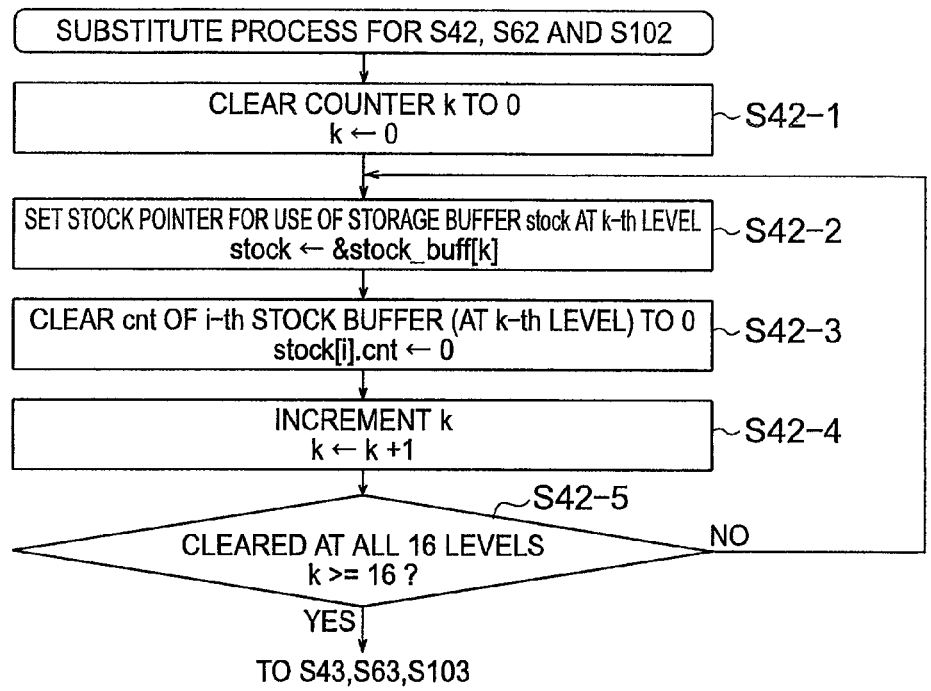
FIG. 26A is a flowchart indicating one example of storage control.

The process of FIG. 26A is the substitute for step S42 of FIG. 9, step S62 of FIG. 12 or step S102 of FIG. 16. The process of FIG. 26A is performed to clear all storage buffers provided for respective levels.

A variable k that represents a level is initialized to zero (step S42-1). Next, a stock pointer is set in order to use a storage buffer stock at a k-th level (step S42-2).

Next, a count value cnt of an i-th stock buffer at the k-th level is set (cleared) to zero (step S42-3). Then, the variable k is incremented (step S42-4). It is then determined whether all storage buffers stock at all levels (for example, 16 levels) have been cleared. If NO in the determination, the process returns to step S42-2. On the contrary, if YES, the process moves to step S43 of FIG. 9, step S63 of FIG. 12 or step S103 of FIG. 16.

Figure 26B:
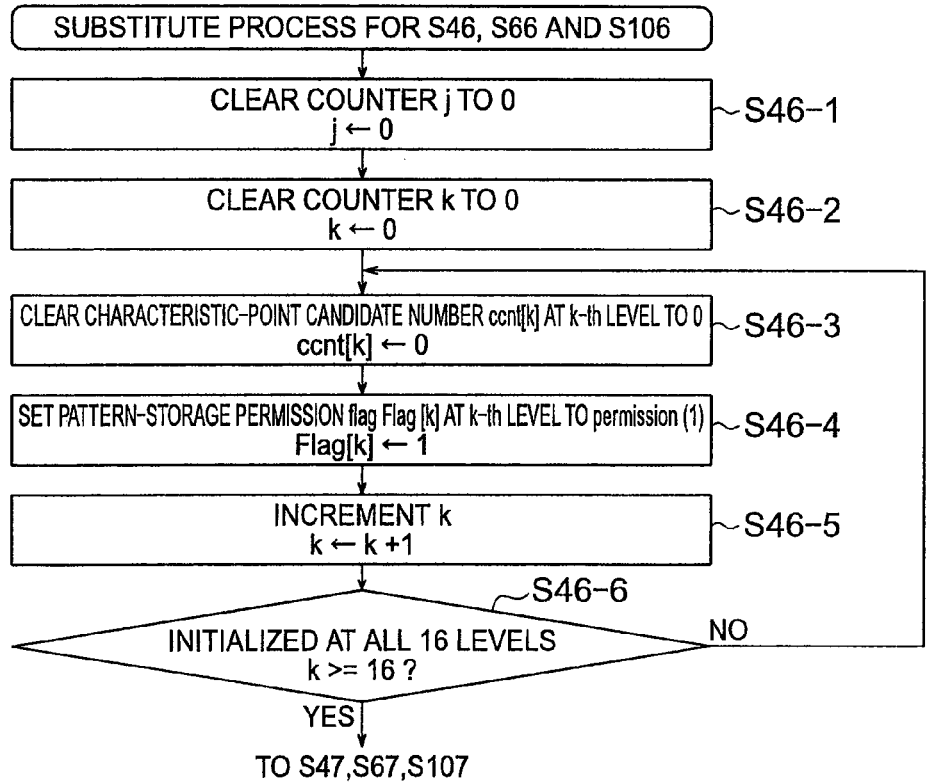
FIG. 26B is a flowchart following to FIG. 26A.

The process of FIG. 26B is the substitute for step S46 of FIG. 9, step S66 of FIG. 12 or step S106 of FIG. 16. The process of FIG. 26B initializes the number of candidates cnt for characteristic-point pattern information at all levels (a characteristic-point candidate number, hereinafter) and a storage permission flag Flag to be set for indicating whether to permit storage in a storage buffer.

Firstly, a variable j that represents a position on a pattern number detected by the pattern detection part 11 is set to zero (step S46-1). Next, a variable k that represents a level is set to zero (step S46-2). Then, a characteristic-point candidate number cnt[k] at a k-th level is set to zero (step S46-3). A storage permission flag Flag [k] at the k-th level is then set to a permitted state (for example, 1) (step S46-4). Next, the variable k is incremented (step S46-5).

Next, it is determined whether the characteristic-point candidate numbers cnt [k] and the storage permission flags Flag [k] at all 16 levels have been cleared (step S46-6). If NO in the determination, the process returns to step S46-3. On the contrary, if YES, the process moves to step S47 of FIG. 9, step S67 of FIG. 12 or step S107 of FIG. 16.

Figure 26C:
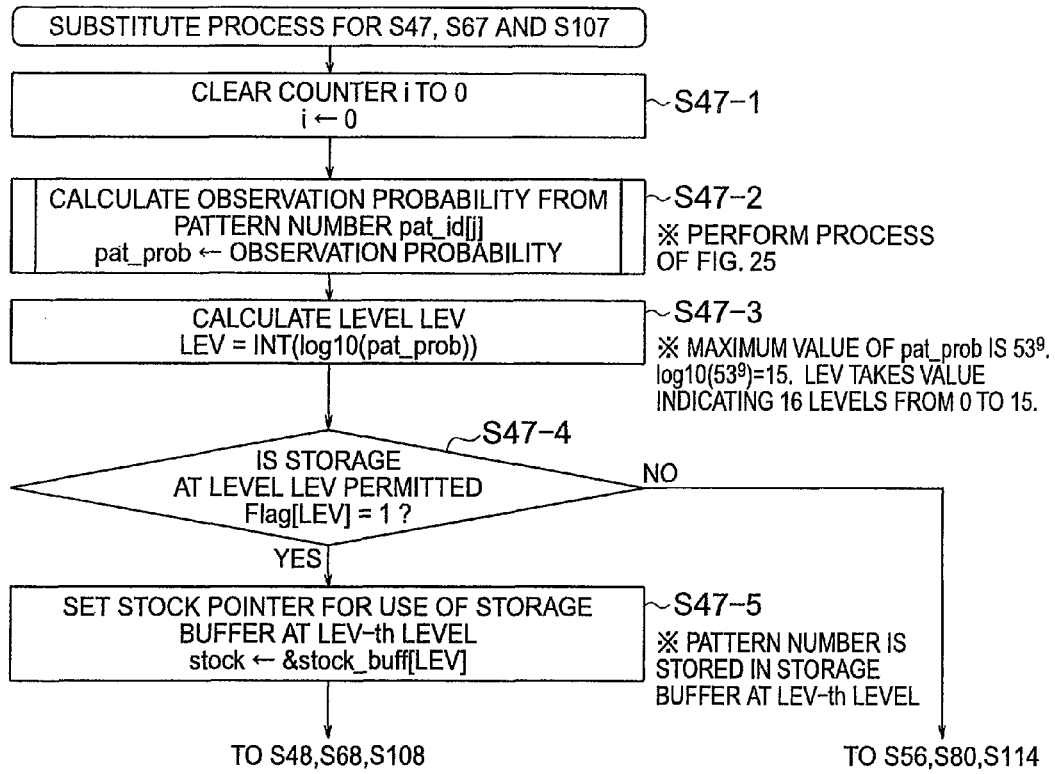
FIG. 26C is a flowchart following to FIG. 26B.

The process of FIG. 26C is the substitute for step S47 of FIG. 9, step S67 of FIG. 12 or step S107 of FIG. 16. The process of FIG. 26C performs storage in a storage buffer only when the storage permission flag Flag indicates permission.

Firstly, a variable i that indicates a position on a storage buffer stock is set to zero (step S47-1). Next, a pattern observation probability pat_prob is calculated from a pattern number pat_id[j] (step S47-2). In this step, the process of FIG. 25 is performed.

Next, a level LEV is calculated from a calculated pattern observation probability pat_prob (step S47-3). The maximum value of the observation probability pat_prob is $53^9$. The common logarithm of $53^9$ is about 15. Therefore, the level LEV takes a value that indicates any of 16 levels in the range from 0 to 15.

It is then determined whether the storage in a storage buffer at the level LEV is permitted (step S47-4). The determination is made by the value of the storage permission flag Flag. If not permitted, the process moves to step S56 of FIG. 10, step S80 of FIG. 13 or step S114 of FIG. 17. If permitted, the setting is performed to store a pattern number or the like in a storage buffer at the LEV-th level (step S47-5). Thereafter, step S48 of FIG. 10, step S68 of FIG. 12 or step S108 of FIG. 17 is performed.

Figure 26D:
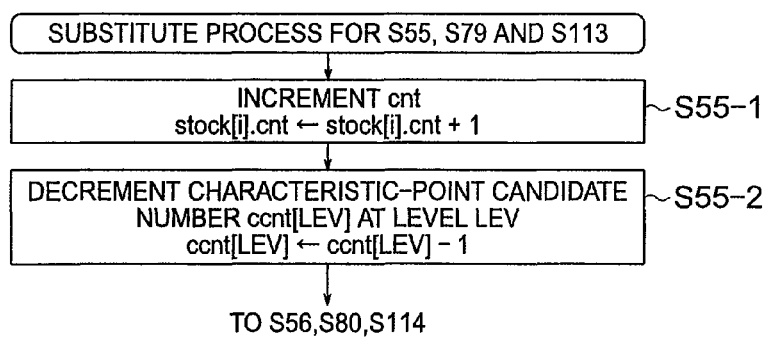
FIG. 26D is a flowchart following to FIG. 26C.

The process of FIG. 26D is the substitute for step S55 of FIG. 10, step S79 of FIG. 13 or step S113 of FIG. 17. The process of FIG. 26D decrements a characteristic-point candidate number ccnt [LEV] when a pattern number pat_id detected by the pattern detection part 11 is identical to a pattern number pat_id of an i-th storage buffer stock, because, the identical pattern number cannot be characteristic-point pattern information.

Firstly, a count value cnt is incremented (step S55-1). Next, a characteristic-point candidate number ccnt[LEV] is decremented (step S55-2). Thereafter, step S56 of FIG. 10, step S80 of FIG. 13 or step S114 of FIG. 17 is performed.

Figure 26E:
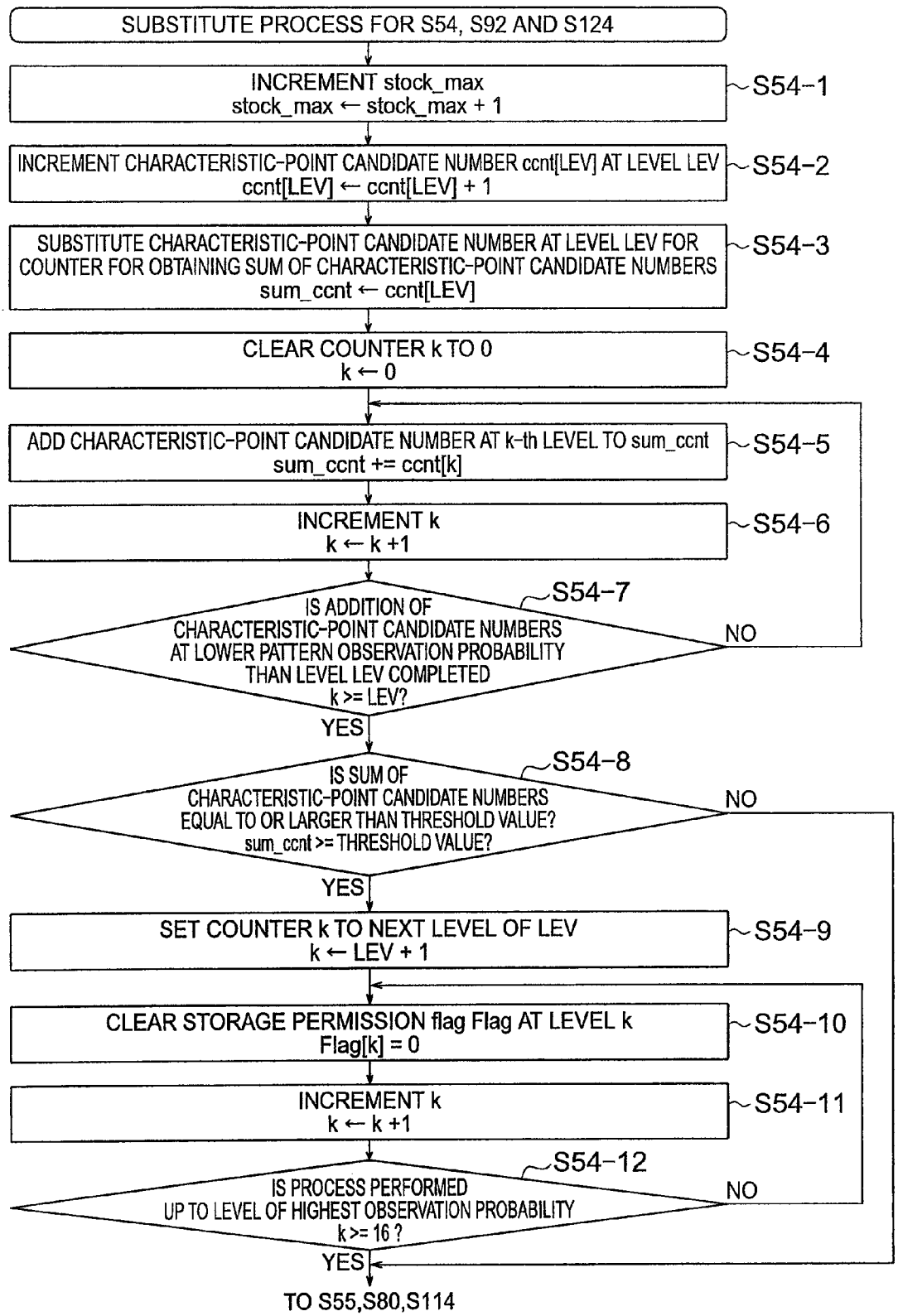
FIG. 26E is a flowchart following to FIG. 26D.

The process of FIG. 26E is the substitute for step S54 of FIG. 10, step S92 of FIG. 14 or step S124 of FIG. 18. The process of FIG. 26E is performed to determine whether the characteristic-point candidate number is equal to or larger than a threshold value, to control the storage of a storage buffer part and set a storage permission flag Flag.

Firstly, a total number stock_max of storage buffer parts is incremented (step S54-1). Next, a characteristic-point candidate number ccnt[LEV] at a level LEV is incremented (step S54-2). Next, ccnt[LSV] is substituted for a count value sum_ccnt that is the sum of characteristic-point candidate numbers ccnt[LEV] at respective levels (step S54-3).

Next, a variable k that represents a level is set to zero (step S54-4). A characteristic-point candidate number at a k-th level is added to the count value sum_ccnt (step S54-5). The variable k is then incremented (step S54-6).

It is then determined whether the addition of characteristic-point candidate numbers is completed, the numbers being at a level of a lower pattern observation probability than the level LEV (step S54-7). If NO in this determination, the process returns to step S54-5. If YES, it is determined whether a sum sum_ccnt of characteristic-point candidate numbers is equal to or larger than a threshold value (step S54-8).

If YES in the determination of step S54-8, the variable k is set to a value at the next level (step S54-9). Next, a storage permission flag Flag at a level k is set to zero (step S54-10). The variable k is then incremented (step S54-11).

Next, it is determined whether the process has been performed up to a level of the highest pattern observation probability (step S54-12). If NO in this determination, the process returns to step S54-10. If YES in this determination or NO in the determination of step S54-8, the process moves to step S55 of FIG. 10, step S80 of FIG. 13 or step S114 of FIG. 114.

<Match-Point Detection Process>

Described next is a match-point detection process. Explained first is an example of detecting a match point by using information on characteristic points extracted from two images. The match-point detection among three images or more can be done by repeatedly performing the match-point detection for two images first and detecting a match point between the result of detection for the two images and a remaining one image that has not undergone the detection, the result of which is used for the detection with another remaining image that has not undergone the detection.

The match-point detection between two images will be explained hereinafter. Characteristic-point pattern information obtained from images A and B are denoted by patInfoA and patInfoB, respectively.

When pattern information on a plurality of characteristic points are included in the characteristic-point pattern information patInfoA, a pattern number corresponding to each pattern is checked against the pattern numbers of all pattern information included in the characteristic-point pattern information patInfoB. A pattern number and its pattern position common to the characteristic-point pattern information patInfoA and patInfoB are then extracted.

Suppose that pattern positions a and b are extracted from the characteristic-point pattern information patInfoA and patInfoB, respectively. This indicates that an object shown at the position a in the image A is shown at the position b in the image B.

Accordingly, by extracting all characteristic-point pattern information having the common pattern number, a plurality of pieces of positional information corresponding to one another between the images A and B are obtained. Of course, there is a case in which only one piece of positional information or no positional information is obtained.

The match-point detection part 14 detects match-point information, such as shown in FIG. 27, by the process described above. The match-point information of FIG. 27 has a pattern number pat_id, a value x0 at a position x in the image A, a value y0 at a position y in the same image A, a value x1 at the position x in the image B, and a value y1 at the position y in the same image B.

The pattern number pat_id is required for further match-point detection with another image. However, the pattern number pat_id may not always be necessary for the detection between two images only.

Figure 28:
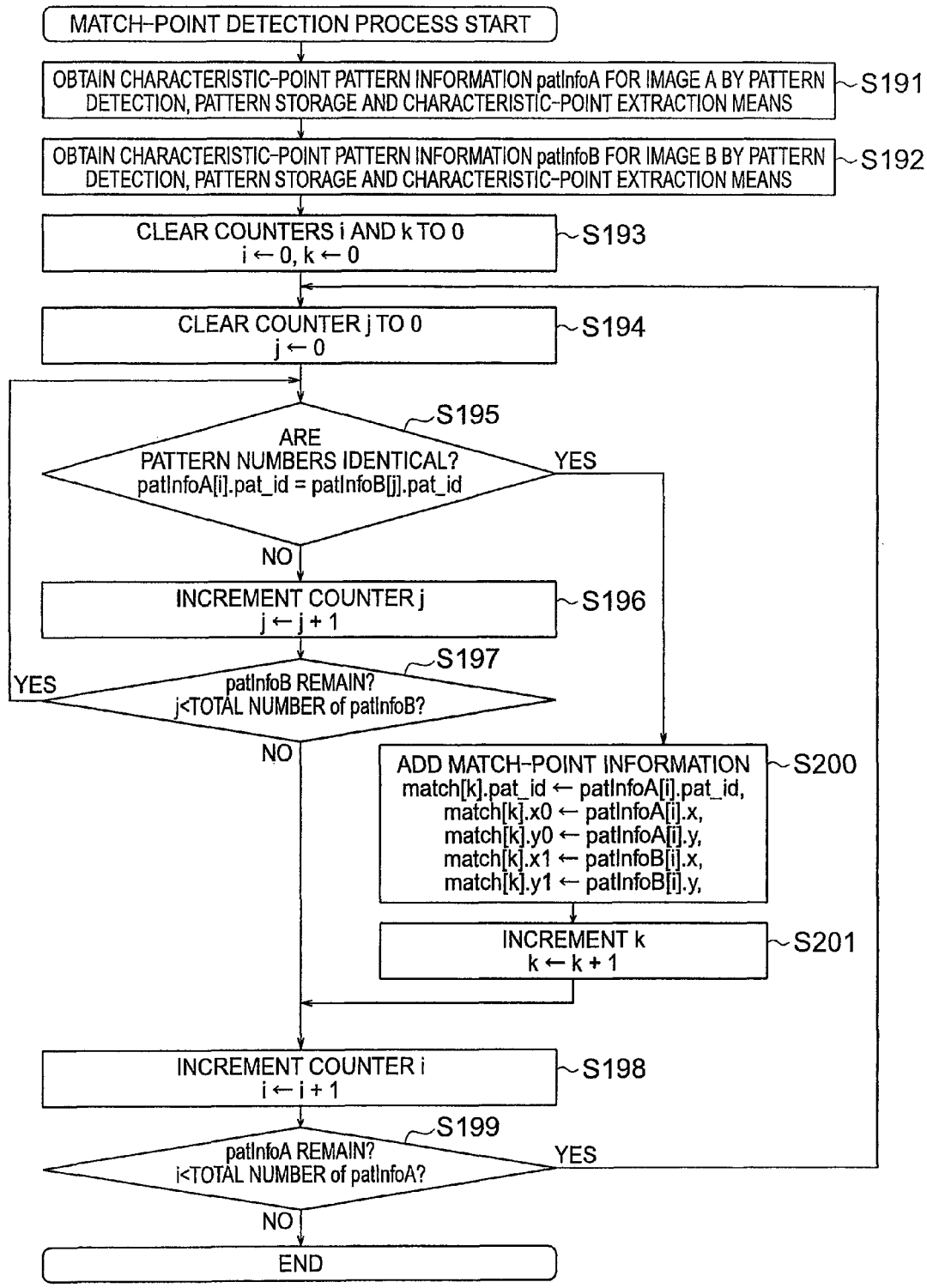
FIG. 28 is a flowchart indicating one example of a match-point detection process performed by a match-point detection part 14.

FIG. 28 is a flowchart indicating one example of the match-point detection process performed by the match-point detection part 14. For the image A, characteristic-point pattern information patInfoA is obtained by the first, second or third characteristic-point detection process described above (step S191). In the same way, characteristic-point pattern information patInfoB is obtained for the image B (step S192).

Next, a variable i that represents a position on the characteristic-point pattern information patInfoA and a variable k that represents the number of match points are initialized to zero (step S193). In the same way, a variable j that represents a position on the characteristic-point pattern information patInfoB is initialized to zero (step S194).

Next, it is determined whether a pattern number of an i-th characteristic-point pattern information patInfoA and that of a j-th characteristic-point pattern information patInfoB are identical to each other (step S195). If both are not identical to each other, the variable j is incremented (step S196). It is then determined whether the variable j has reached the total number of the characteristic-point pattern information patInfoB (step S197). If not reached, step S195 and the succeeding steps are performed whereas if reached, the variable i is incremented (step S198).

It is determined whether the variable i has reached the total number of the characteristic-point pattern information patInfoA (step S199). If not reached, step S194 and the succeeding steps are performed, whereas if reached, the process ends.

On the contrary, if it is determined in step S195 that both pattern numbers are identical to each other, match-point information such as shown in FIG. 27 is added (step S200). Next, a variable k that represents the number of pieces of match-point information is incremented (step S201). And, step S198 and the succeeding steps are performed.

<Movement, Rotation and Scaling of Image>

Match-point information detected by the match-point detection part 14 can be used for a variety of purposes. Explained here is an example in which, based on match-point information about two images A and B, at least one process among movement, rotation and scaling is performed to the image A so that the image A becomes closer to the image B.

Coordinates obtained after coordinates (x, y) in the image A undergo any coordinate transformation are denoted by (x', y'), hereinafter.

For example, coordinates (x', y') obtained by translating the coordinates (x, y) by amounts of movement of dx and dy are expressed by the following equation (6). In this equation (6), the transformation is performed with a 3×3 matrix G having three-dimensional vectors by adding z=1 to the pre-transformed two dimensional coordinates.

$$\begin{pmatrix} x' \\ y' \\ 1 \end{pmatrix} = \begin{vmatrix} 1 & 0 & dx \\ 0 & 1 & dy \\ 0 & 0 & 1 \end{vmatrix} * \begin{pmatrix} x \\ y \\ 1 \end{pmatrix} = \begin{pmatrix} x+dx \\ y+dy \\ 1 \end{pmatrix} \qquad (6)$$

Coordinates (x', y') obtained by rotating the coordinates (x, y) about the origin by θ degrees are expressed by the following equation (7).

$$\begin{pmatrix} x' \\ y' \\ 1 \end{pmatrix} = \begin{vmatrix} \cos\theta & \sin\theta & 0 \\ -\sin\theta & \cos\theta & 0 \\ 0 & 0 & 1 \end{vmatrix} * \begin{pmatrix} x \\ y \\ 1 \end{pmatrix} = \begin{pmatrix} x\cos\theta + y\sin\theta \\ -x\sin\theta + y\cos\theta \\ 1 \end{pmatrix} \qquad (7)$$

Coordinates (x', y') obtained by scaling the coordinates (x, y) with respect to the origin as a fixed point by a scaling factor f are expressed by the following equation (8).

$$\begin{pmatrix} x' \\ y' \\ 1 \end{pmatrix} = \begin{vmatrix} f & 0 & 0 \\ 0 & f & 0 \\ 0 & 0 & 1 \end{vmatrix} * \begin{pmatrix} x \\ y \\ 1 \end{pmatrix} = \begin{pmatrix} fx \\ fy \\ 1 \end{pmatrix} \qquad (8)$$

A transformation equation given by combining the equations (6) to (8) is expressed by the following equation (9).

$$\begin{pmatrix} x' \\ y' \\ 1 \end{pmatrix} = \begin{pmatrix} f & 0 & 0 \\ 0 & f & 0 \\ 0 & 0 & 1 \end{pmatrix} * \begin{vmatrix} \cos\theta & \sin\theta & 0 \\ -\sin\theta & \cos\theta & 0 \\ 0 & 0 & 1 \end{vmatrix} * \begin{pmatrix} 1 & 0 & dx \\ 0 & 1 & dy \\ 0 & 0 & 1 \end{pmatrix} * \begin{pmatrix} x \\ y \\ 1 \end{pmatrix} \qquad (9)$$

A matrix G obtained by multiplying the three 3×3 matrices in the right side of the equation (9) indicates that movement, rotation, and scaling are performed together.

Here, it is presupposed that q=g(p) is given when the transformation of p=(x, y) into q=(x', y') is denoted by g.

When positions of match-point information detected by the point-of-match detection part 14 are An and Bn on an n-th image A and an n-th image B, respectively, practical examples of the transformation, such as, amounts of movement dx and dy, a rotation angle Θ, and a scaling factor f can be detected by obtaining transformation g that gives $$B0 = g(A0)$$

$$B1 = g(Aa)$$

$$...$$

$$Bn = g(An).$$

Or, the square of the length of a vector v is denoted by Len2(v). It is possible to calculate Len2(v) from a scalar product of vectors v. By using Len2(v), the sum of the square of the distance between a position on an image A and the corresponding position on an image B is expressed by the following equation (10).

$$\text{Len2}(B0-g(A0))+\text{Len2}(B1-g(A1))+\ldots+\text{Len2}(Bn-g(An)) \quad (10)$$

The amount of movement, the amount of rotation, and the scaling factor can be calculated by obtaining amounts of movement dx and dy, a rotation angle Θ, and a scaling factor f that make the equation (10) give a smaller value.

Calculation of the equation (10) can be done by so-called convergent calculation.

Another method is to perform processing by using the following matrix H instead of the matrix G.

Position $B0$ after transformation= (11)

$H*$Position $A0$ before transformation

Position $B1$ after transformation=

$H*$Position $A1$ before transformation

...

Position $Bn$ after transformation=

$H*$Position $An$ before transformation

The equation (11) can be expressed as B=H*A, which gives a matrix B of 3 rows and n+1 columns having positions 0, 1, ..., n after transformation in column vector by multiplying a matrix A of 3 rows and n+1 columns having positions 0, 1, ..., n before transformation in column vector by the matrix H.

In general, there is an inverse matrix only for a square matrix. When a non-square matrix Ainv of n+1 rows and 3 columns is a unit matrix of A*Ainv=3×3, Ainv is called a pseudo-inverse matrix.

When B=H*A is multiplied by Ainv on both sides, the following equation (12) is given.

$$B*Ainv=H*A*Ainv \quad (12)$$

The equation (12) is transformed into the following equation (13) because A*Ainv is a unit matrix.

$$B*Ainv=H*\text{unit matrix}=H \quad (13)$$

A matrix H is given by the equation (13). The transformation to be performed by the matrix H includes not only movement, rotation, and scaling but also more complex transformation. As discussed above, the transformation by the matrix H is the transformation having all flexibility to perform spatial linear transformation by transforming two-dimensional coordinates into coordinates on three-dimensional plane Z=1. When image transformation by the matrix H is performed, the matrix H is given based on the result of image transformation. It is then possible to perform transformation including movement, rotation, scaling, and also transformation having all of the other flexibility.

As the transformation other than movement, rotation, and scaling, it is also possible to perform transformation from a square to a parallelogram, scaling at different factors in the vertical and horizontal directions. With the transformation, the present embodiment is adoptable to scaling only in the direction in which an object to be photographed is rotating, for example. If the processing performance is high, a technique with the matrix H may be preferable, which does not require calculation of G.

In contrast, when existing image processing such as movement, rotation, and scaling are used, amounts of movement dx and dy, a rotation angle Θ, and a scaling factor f are obtained for the matrix G, as described above. The processing may be designed to process any one of the amounts of movement dx and dy, the rotation angle Θ, and the scaling factor f.

Also for performing movement, rotation or scaling for three or more of images, the matrix G or H is obtained in the same process described above. For example, when there is an image C in addition to images A and B, with positions C0 to Cn on the image C, the following equation (14) is calculated instead of the equation (10).

$$\text{Len2}(B0-g(A0))+\text{Len2}(C0-g(A0))+\text{Len2}(B1-g(A1))+\text{Len2}(C1-g(A1))+\ldots+\text{Len2}(Bn-g(An))+\text{Len2}(C1-g(An)) \quad (14)$$

According to the (14), the sum of the square of distances of match points among the images A, B and C after transformation becomes lower. The lowered sum means that the image A is adjusted to the average position on the images B and C. With mach-point processing further with an image D, the image A is adjusted to the average position on the images B, C and D. By using this characteristic, the process can be applied to correction of blurred images due to hand shaking for video cameras.

FIG. 29 is a view illustrating an image transformation technique based on the match-point detection information described above. FIG. 29 shows an example of image transformation so that match points of three scene images A, B and C are adjusted to one another and the positions of the match points are superimposed on one another. Suppose that apples in the scene images A, B and C are detected as match points. In this case, image transformation is performed by using the matrix G or H described above. Thereafter, image composition is performed so that the match points of three scene images after transformation are superimposed on one another.

When the present embodiment is applied to a video camera, the first, the second or the third characteristic-point extraction process is performed to each scene (frame or field) image. The scene to be processed is the one just before some current reference scenes (for example, 2 to 60 scenes).

When the process is performed so that the value of the equation (14) becomes smaller, transformation is performed in such a manner that the scene to be processed is adjusted to or becomes closer to an average position with respect to reference scenes. This results in smoothing of the movement, rotation, or scaling due to hand shaking. This means that, when the process is performed by a camera with a frame rate of 30 frames/second with current 30 scenes as reference scenes, an adjustment is made to give an image in which 1-sec motion is smoothed. Accordingly, slight vibration can be removed from an image to mitigate problems due to hand or object shaking.

When match-point detection is performed with reference scenes, characteristic-point pattern information only requires to be stored, with no necessity of storing image data itself. This is also an excellent point of the present embodiment. Blurred images due to instantaneous movement are more reduced as the number of reference scenes is increased. For example, even when the reference scenes are increased to about 60 scenes, there is no necessity of storing image itself. Therefore, installation is easy with less memory consumption.

A known method performs processing while summing up movement information (movement information based on interframe difference) between scenes. Since, the known method compares images themselves, it is at most to compare the current image and an image just before the current image, with calculation of the amount of movement or the like to minimize the interframe difference. On the contrary, according to the present embodiment, error accumulation can be avoided, and in addition, multiple scenes different in time are also compared, thereby extremely improving detection accuracy.

Accordingly, the present embodiment achieves a high correction effect of blurred images due to hand shaking, with less erroneous operation. Moreover, the present embodiment achieves correction of blurred images due to movement and also camera inclination (rotation), forward or backward panning, and zooming (scaling).

By way of match-point detection and image transformation of a plurality of images according to the method described above, transformation is performed in such a manner that the same object is shown at the same pixel position. This type of image transformation has several advantages.

One advantage is a noise reduction effect. A random noise is generated randomly, and hence is difficult to reduce. However, by using a characteristic of random generation, a random noise can be reduced by superimposition of a plurality of images. There are several types of image superimposition. Described below are methods of averaging and calculation of a median value.

An image obtained by averaging the same pixel positions of a plurality of image-transformed images shows the same object on the same image position. Therefore, a signal S obtained from the object by averaging is constant. On the other hand, the noise is random, and hence is reduced in accordance with the number of pixels to be averaged. Therefore, in case of combining a plurality of image-transformed images, S/N can be improved in accordance with the number of averaged pixels, with noise reduction.

It is already known that a random noise is irregular and exhibits a normal distribution. Therefore, when a plurality of image-transformed images are combined, the noise can be reduced by using a median value. The median value is used, not for neighboring pixels, but in combining a plurality of pixels. Therefore, there is no possibility causing glistening of image which often occurs with the filtering by a median filter.

Weighting may be performed in the averaging described, according to need. Hereinafter, an example of weighting will be explained.

Composition of a series of images taken while varying exposure has an advantage of wider dynamic range in addition to noise reduction.

An image taken in a bright state has less noise. Hence, larger weighting is applied to such an image in averaging. In contrast, smaller weighting is applied to an image taken in a dark state in averaging. A weight is set to zero for a part of a bright image if the part has a saturated color or luminance which is in a whiteout condition.

When a weight is drastically varied over a gradation region in which luminance gradually becomes higher to a saturation point, the image may appear to be different from an original state. In order to avoid such a problem, a weight is gradually reduced before the saturation point.

When performing such weighting, it is preferable to calculate a weight with a function in which a weight is increased in accordance with a pixel value but starts reduction before a saturation point and then becomes zero. A look-up table is an example of this kind of function practically installed, with the least amount of operation and high flexibility.

FIG. 30 is a view showing one example of a look-up table (referred to as LUT, hereinafter) in the form of a graph. In FIG. 30, the pixel value is set in the range from 0 to 255, and also, the weight is set in the range from 0 to 255. For each color of R, G and B, a respective LUT or an LUT common to these colors is looked up for applying a weight corresponding to a pixel value.

Figure 31:
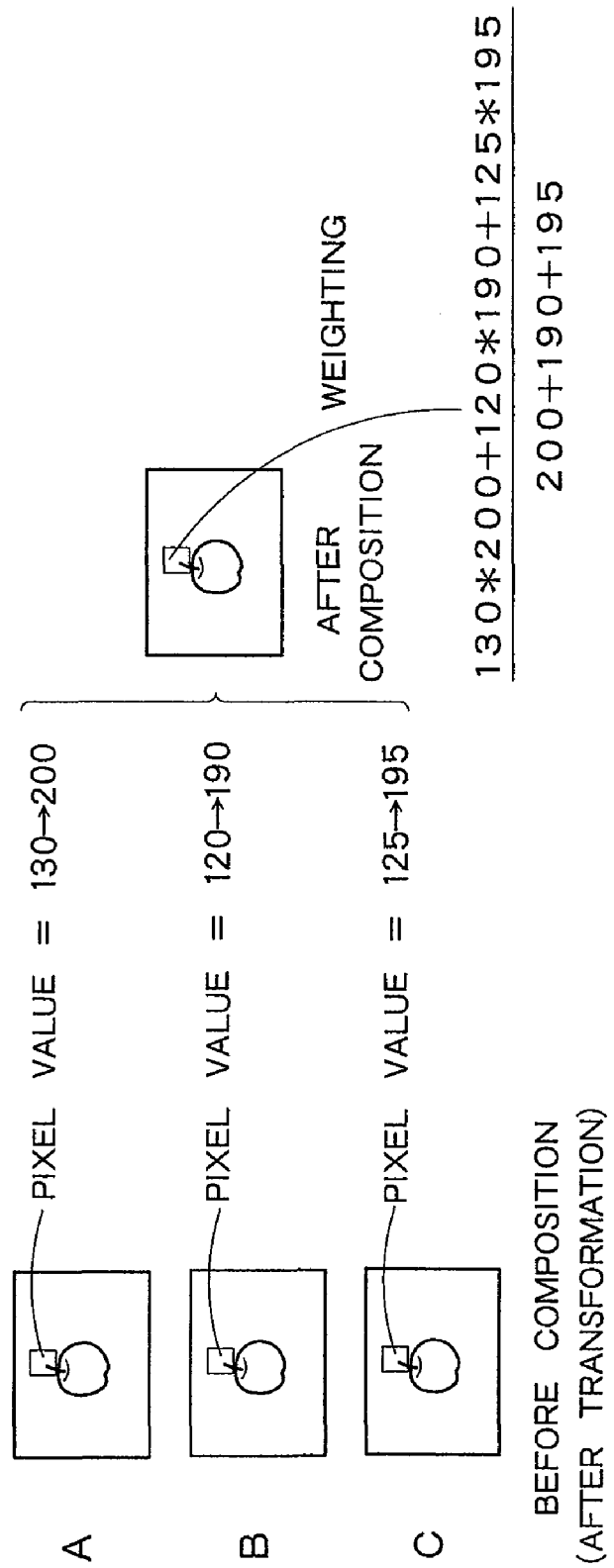
FIG. 31 is a view illustrating one example of weighting to each of three scene images after image transformation in FIG. 29.

FIG. 31 is a view illustrating one example of the weight. FIG. 31 shows an example of the weight to each of the image-transformed three scene images of FIG. 29. Different weight is performed to each scene image with respect to a specific pixel position in each scene image. For example, when a pixel value at a specific pixel position in a scene image A is 130, an LUT is looked up to acquire a weight of 200. In the same way, when a pixel value at a specific pixel position in a scene image B is 120, an LUT is looked up to acquire a weight of 190. Moreover, when a pixel value at a specific pixel position in a scene image C is 125, an LUT is looked up to acquire a weight of 195. And then, a combined pixel value is calculated from the following equation (15).

$$\text{Combined pixel value} = \frac{130 \times 200 + 120 \times 190 + 125 \times 195}{200 + 190 + 195} \quad (15)$$

When the present embodiment is applied to a digital still camera, it is possible to record an image with a wide dynamic range, rich gradation, and less noise from a series of images taken in different exposure conditions.

Figure 32:
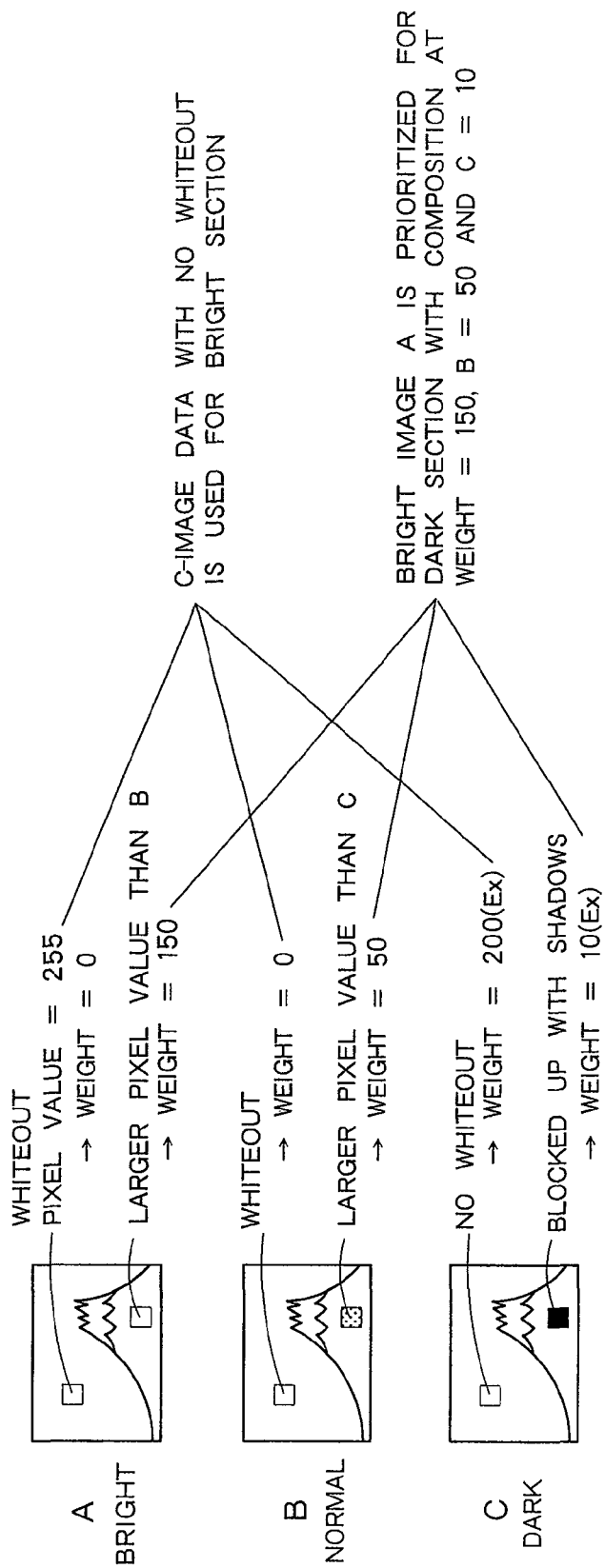
FIG. 32 is a view illustrating one example of weighting to three scene images A, B and C taken in different exposure conditions.

FIG. 32 is a view illustrating one example of the weight to three scene images A, B and C taken in different exposure conditions. It is presupposed that the scene images were taken at a lower exposure level in order of A, B and C. The scene images A and B taken at a higher exposure level show a whiteout condition at a portion of the image. The weight is set to zero for a pixel area (pixel value=255) in a whiteout condition. The weight for the scene image C showing any whiteout condition in this pixel area is not zero. Therefore, the image data of the scene image C is used for the result of composition.

A portion of the scene image C is blocked up with shadows. The weight is set to a lower value for the pixel area that is blocked up with shadows than the scene images A and B that are not blocked up with shadows. Therefore, in composition, the scene image A is weighted at the largest value, followed by the scene images B and C at a lower value in order.

The weight described above does not depend on other images. Therefore, the weight can be decided without referring to a series of images simultaneously and a composed image can be stored while the weight is performed at any time according to need. Accordingly, the amount of work memories to be required simultaneously is reduced.

In a work memory, for example, the total sum of pixels SumR, SumG and SumB for the number of pixels and the total of weights SumFact are stored and initialized to zero. When an image already transformed by the prior transformation process is input, a weight (Fact) is calculated from each pixel value, and a value obtained by multiplying an R-pixel value and the weight (Fact) is added to SumR. In the same way, a value obtained by multiplying a G-pixel value and the weight (Fact) is added to SumG. Also in the same way, a value obtained by multiplying a B-pixel value and the weight (Fact) is added to SumB.

When the addition is complete for all pixels of a series of images as described above, SumR, SumG and SumB of each pixel are divided by SumFact to obtain an average pixel value.

When SumR, SumG and SumB of each pixel are divided by SumFact/4 instead of SumFact, a pixel value four times larger than that of an image before composition is obtained. For example, when composing four images, since gradation is about four times that of before composition, a rich gradation is gained by obtaining a 4-times larger pixel value.

Another application of the present embodiment is the creation of an image that is in focus in a range wide as much as possible from a series of images taken while varying the focal point. This application also uses a weighted average of weights set for respective pixels.

In this case, a weighted average is preferably performed so that a larger weight is applied to a portion that is more in focus whereas a smaller weight is applied to a portion that is less in focus. There are several techniques for this. An example to be explained below is that a portion containing higher frequency components is determined to be more in focus and then a larger weight is set.

When an image to be processed is filtered by a high-frequency detection filter that is expressed by a matrix of a equation (16), a larger value is calculated for a portion containing higher frequency components.

$$\begin{vmatrix} -1 & -2 & -1 \\ -2 & 12 & -2 \\ -1 & -2 & -1 \end{vmatrix} \quad (16)$$

The absolute value or the square of a calculated value may be used as a weight. There is no necessity of different processing for each of R, G and B even for a color image. Filtering after obtaining luminance (for example, luminance Y=(3R+6G+B)/10) from R, G and B gives a smaller total processing amount, hence advantageous.

The filtering described above is performed only for weight calculation. The luminance calculation is thus not necessarily accurate. When a smaller processing amount is desired, the calculation may further be simplified (for example, Y=(R+2G+B)/4).

FIG. 33 is a view illustrating a technique of adjusting the weight in accordance with a focal point. Suppose that a human being is in focus in a scene image A, a tree is in focus in a scene image B, and a mountain is in focus in a scene image C. A larger weight is set to the scene image A for a pixel area in which the human being is shown, to the scene image B for a pixel area in which the tree is shown, and to the scene image C for a pixel area in which the mountain is shown.

In this way, an image is obtained which is in focus entirely from near to far.

As described above, according to the present embodiment, it is possible to detect a lot of match points rapidly and accurately with less calculation amount. Therefore, the problem on calculation amount that is a disadvantage of the known methods can be solved. Allowance (a threshold level) is given to a relative large-and-small relation among the values of local pixels in the present embodiment. Therefore, the present embodiment is tolerant not only to a variety of types of noise (a random noise and a block or mosquito noise in compression) but also inclination or scaling (change in scaling factor). Accordingly, the present embodiment can provide a plurality of pieces of vector information that indicate, for example, that a position a on an image 1 corresponds to a position b on an image 2. The present embodiment can also detect not only translation but also rotation and scaling. Moreover, the present embodiment is applicable to more advanced way of correction of blurred images with three-dimensional camera vectors. Because of a high speed process of the present embodiment, it is possible to quickly finish match-point detection between one image and a plurality of images, between a plurality of images and a plurality of images, etc.

Accordingly, a lot of match points can be found at higher accuracy in the present embodiment.

By applying the present embodiment, it is possible to provide an image processing apparatus, a digital still camera, a digital video camera, etc., each equipped with the match-point detection function described above. However, the range of application of the present embodiment is not limited to the above described applications. The present embodiment can detect a lot of match points with no increase in operation amount. Therefore, a smaller moving object can be detected in finding out only moving objects from videos. Thanks to high accuracy, the present embodiment is advantageous in chasing such a smaller moving object. Moreover, the present embodiment is applicable to zooming while following the motion of an object to be photographed, giving warning to an approaching human being or object by processing images from a vehicle-mounted video camera, and a surveillance camera that follows an incoming person, etc. in a wide range of application.

Accordingly, the present embodiment can detect accurate match points from a plurality of images quickly with less calculation amount. Therefore, by applying the present embodiment, it is possible to produce applications products with a variety of features.

The embodiment of the present invention is not limited to the respective embodiments described above but includes a variety of modifications conceivable by persons skilled in the art. The advantages of the present invention are also not limited to those explained above. Accordingly, various addition, changes, and partial omissions may be made without departing from the scope and spirit of the inventions derived from the accompanying claims and their equivalents.

At least part of the image match-point detection apparatus explained in the embodiment may be configured with hardware or software. When it is configured with software, a program that performs at least part of the functions of the image match-point detection apparatus may be stored in a storage medium such as a flexible disk and CD-ROM, and then installed in a computer to run thereon. The storage medium may not be limited to a detachable one such as a magnetic disk and an optical disk but may be a standalone type such as a hard disk drive and a memory.

Moreover, a program that achieves the function of at least part of the image match-point detection apparatus may be distributed via a communication network (including wireless communication) such as the Internet. The program may also be distributed via an online network such as the Internet or a wireless network, or stored in a storage medium and distributed under the condition that the program is encoded, modulated or compressed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An image match-point detection apparatus comprising:
a pattern detection part configured to express a pattern image of each of pixel blocks comprising a plurality of pixels in each of a plurality of bitmap images, by a pattern number of a numerical value expressing a characteristic of each pixel block, the pattern number comprising the number of bits equal to or smaller than the number of original pixel bits equal to the total number of bits of all pixels in each pixel block, and to detect, for each pixel block, pattern information comprising a pair of the pattern number of each pixel block and a pattern position expressing a position of each pixel block;

a pattern storage part configured to classify the pattern information contained in each of the bitmap images by the pattern number and to store the pattern number, the number of times of appearance of an identical pattern number, and information on the pattern position corresponding to each pattern number;

a characteristic-point extraction part configured, for each of the bitmap images, to extract the pattern information that the number of times of appearance of the pattern number is only once, as characteristic-point pattern information, by using information stored in the pattern storage part; and a match-point detection part configured to determine whether the pattern numbers of the pattern information extracted as the characteristic-point pattern information for the bitmap images are identical to one another and to detect a plurality of the pattern information comprising the identical pattern number, as match-point information.

2. The image match-point detection apparatus of claim 1, wherein the pattern storage part stores, for each of the pattern numbers, a sum of coordinates of pattern positions comprising the identical pattern number, a maximum value among coordinates of the pattern positions, and a minimum value among coordinates of the pattern positions, as information on the pattern position; and the characteristic-point extraction part determines whether a difference between the maximum and minimum values stored in the pattern storage part is smaller than a predetermined threshold value when the number of times of appearance of the pattern number in the corresponding bitmap image is two times or more and extracts the pattern information corresponding to the pattern number that is determined as smaller than the threshold value, as the characteristic-point pattern information, and extracts an average value of positions obtained by dividing the sum of coordinates of pattern positions corresponding to the pattern number by the number of times of appearance of the pattern number, as the pattern position of the characteristic-point pattern information.

3. The image match-point detection apparatus of claim 1, wherein the pattern storage part stores, for each of the pattern numbers, a sum of coordinates of the pattern positions comprising the identical pattern number and the sum of the square obtained by adding the square of coordinates of pattern positions on each coordinate axis; and the characteristic-point extraction part calculates standard deviation by using the sum of the pattern positions comprising the identical pattern number, the sum of the square, both stored the pattern storage part, and the number of times of appearance of the pattern number when the number of times of appearance of the pattern number in the corresponding bitmap image is two times or more, determines, for each pattern number, whether the standard deviation is smaller than a predetermined threshold value, extracts the pattern information corresponding to the pattern number determined as smaller than the threshold value, as the characteristic-point pattern information, and extracts an average value of positions obtained by dividing the sum corresponding to the pattern number by the number of times of appearance of the pattern number, as the pattern position of the characteristic-point pattern information.

4. The image match-point detection apparatus of claim 1, wherein the pattern detection part comprises a plurality of pattern-number converting parts configured to generate the pattern numbers different from one another for the identical pattern image so that the pattern numbers does not overlap, when the pattern image is converted into the pattern number; and the pattern storage part stores the pattern number, the number of times of appearance of the identical pattern number, and information on the pattern position corresponding to each pattern number, for each of a plurality of pattern numbers generated by the pattern-number converting parts.

5. The image match-point detection apparatus of claim 1 further comprising a pattern probability calculation part configured to calculate a probability that a pattern number detected by the pattern detection part is contained in a standard bitmap image, wherein the pattern storage part stores only the pattern information corresponding to the pattern number in a case where the probability is smaller than a predetermined threshold value.

6. The image match-point detection apparatus of claim 5, wherein the pattern storage part includes:

a level classification part configured to classify the probability into a plurality of levels according to a degree of the probability;

a characteristic-point candidate counting part, provided for each of the levels, configured to count the number of candidates for the characteristic-point information belonging to the corresponding level or a level lower than the corresponding level;

a plurality of storage buffers, provided for each of the levels, configured to store the pattern numbers of the candidates for the characteristic-point information, the number of times of appearance of the identical pattern number, and information on the pattern position corresponding to each pattern number; and a pattern storage control part configured to permit storage in the corresponding storage buffer when the number counted by the characteristic-point candidate counting part is smaller than a predetermined threshold value, whereas to prohibit storage in all storage buffers at the corresponding level or a higher level when the number counted by the characteristic-point candidate counting part is equal to or larger than the predetermined threshold value.

7. The image match-point detection apparatus of claim 1 further comprising a blurred-image correction part configured to select one of two images or more each containing the characteristic-point pattern information as an image to be processed and to refer to another image containing the characteristic-point pattern information, to perform match-point detection between the characteristic-point pattern information of the image to be processed and the characteristic-point pattern information of the other image, to perform at least either one of a movement, rotation, and scaling process to the image to be processed, and then to correct a blurred image of the image to be processed.

8. A method for image match-point detection comprising:

expressing a pattern image of each of pixel blocks comprising a plurality of pixels in each of a plurality of bitmap images by a pattern number of a numerical value expressing a characteristic of each pixel block, the pattern number comprising the number of bits equal to or smaller than the number of original pixel bits equal to the total number of bits of all pixels in each pixel block, and detecting, for each pixel block, pattern information comprising a pair of the pattern number of each pixel block and a pattern position expressing a position of each pixel block;

classifying the pattern information contained in each of the bitmap images according to the pattern number by the pattern number, the number of times of appearance of an identical pattern number, and information on the pattern position corresponding to each pattern number;

for each of the bitmap images, extracting the pattern information that the number of times of appearance of the pattern number is only once, as characteristic-point pattern information, by using information stored in the pattern storage part; and determining whether the pattern numbers of the pattern information extracted as the characteristic-point pattern information for the bitmap images are identical to one another and detecting a plurality of the pattern information comprising the identical pattern number, as match-point information.

9. A non-transitory computer-readable storage medium which stores a program causing a computer to perform image match-point detection, the program comprising:

expressing a pattern image of each of pixel blocks comprising a plurality of pixels in each of a plurality of bitmap images, by a pattern number of a numerical value expressing a characteristic of each pixel block, the pattern number comprising the number of bits equal to or smaller than the number of original pixel bits equal to the total number of bits of all pixels in each pixel block, and detecting, for each pixel block, pattern information comprising a pair of the pattern number of each pixel block and a pattern position expressing a position of each pixel block;

classifying the pattern information contained in each of the bitmap images by the pattern number and storing the pattern number, the number of times of appearance of the identical pattern number, and information on the pattern position corresponding to each pattern number;

for each of the bitmap images, extracting the pattern information that the number of times of appearance of the pattern number is only once, as characteristic-point pattern information, by using information stored in the pattern storage part; and determining whether the pattern numbers of the pattern information extracted as the characteristic-point pattern information for the bitmap images are identical to one another and detecting a plurality of the pattern information comprising the identical pattern number, as match-point information.

* * * * *